(12) United States Patent
Li et al.

(10) Patent No.: US 11,769,227 B2
(45) Date of Patent: Sep. 26, 2023

(54) GENERATING SYNTHESIZED DIGITAL IMAGES UTILIZING A MULTI-RESOLUTION GENERATOR NEURAL NETWORK

(71) Applicant: Adobe Inc., San Jose, CA (US)

(72) Inventors: Yuheng Li, Davis, CA (US); Yijun Li, Seattle, WA (US); Jingwan Lu, Santa Clara, CA (US); Elya Shechtman, Seattle, WA (US); Krishna Kumar Singh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 128 days.

(21) Appl. No.: 17/400,426

(22) Filed: Aug. 12, 2021

(65) Prior Publication Data

US 2023/0053588 A1   Feb. 23, 2023

(51) Int. Cl.
*G06K 9/00* (2022.01)
*G06T 3/40* (2006.01)
*G06N 3/04* (2023.01)
*G06V 10/40* (2022.01)
*G06V 30/262* (2022.01)
*G06F 18/25* (2023.01)

(52) U.S. Cl.
CPC .......... *G06T 3/4046* (2013.01); *G06F 18/253* (2023.01); *G06N 3/04* (2013.01); *G06V 10/40* (2022.01); *G06V 30/274* (2022.01)

(58) Field of Classification Search
CPC ....... G06T 3/4046; G06F 18/253; G06N 3/04; G06V 10/40; G06V 30/274
See application file for complete search history.

(56) References Cited

U.S. PATENT DOCUMENTS

| 10,049,308 | B1 | 8/2018 | Dhua et al. |
| 10,216,766 | B2 | 2/2019 | Lin et al. |
| 10,740,647 | B2 | 8/2020 | Du et al. |
| 11,126,890 | B2 | 9/2021 | Lin et al. |

(Continued)

OTHER PUBLICATIONS

Martin Arjovsky, Soumith Chintala, and Leon Bottou. Wasserstein gan. ICML, 2017.

(Continued)

*Primary Examiner* — Dhaval V Patel
(74) *Attorney, Agent, or Firm* — Keller Preece PLLC

(57) ABSTRACT

This disclosure describes methods, non-transitory computer readable storage media, and systems that generate synthesized digital images via multi-resolution generator neural networks. The disclosed system extracts multi-resolution features from a scene representation to condition a spatial feature tensor and a latent code to modulate an output of a generator neural network. For example, the disclosed systems utilizes a base encoder of the generator neural network to generate a feature set from a semantic label map of a scene. The disclosed system then utilizes a bottom-up encoder to extract multi-resolution features and generate a latent code from the feature set. Furthermore, the disclosed system determines a spatial feature tensor by utilizing a top-down encoder to up-sample and aggregate the multi-resolution features. The disclosed system then utilizes a decoder to generate a synthesized digital image based on the spatial feature tensor and the latent code.

20 Claims, 15 Drawing Sheets

(56) References Cited

U.S. PATENT DOCUMENTS

| | | | |
|---|---|---|---|
| 2016/0314600 A1 | 10/2016 | Nguyen et al. | |
| 2018/0130207 A1 | 5/2018 | Anderson et al. | |
| 2019/0220977 A1 | 7/2019 | Zhou et al. | |
| 2021/0004589 A1 | 1/2021 | Turkelson et al. | |
| 2021/0042558 A1 | 2/2021 | Choi et al. | |
| 2021/0049739 A1* | 2/2021 | Schroers | G06T 3/4046 |
| 2021/0110588 A1 | 4/2021 | Adamson, III | |
| 2021/0118129 A1 | 4/2021 | Kearney et al. | |
| 2021/0216817 A1* | 7/2021 | Sommerlade | G06T 11/00 |
| 2021/0358123 A1 | 11/2021 | Kearney et al. | |
| 2021/0358604 A1 | 11/2021 | Kearney et al. | |
| 2021/0397811 A1 | 12/2021 | Richter | |
| 2022/0083807 A1 | 3/2022 | Zhang et al. | |
| 2022/0126864 A1 | 4/2022 | Moustafa et al. | |
| 2022/0138913 A1 | 5/2022 | Huang et al. | |
| 2022/0277491 A1* | 9/2022 | Lee | G06T 9/002 |
| 2022/0383041 A1* | 12/2022 | Ning | G06V 10/751 |

OTHER PUBLICATIONS

Xavier Puig, Tete Xiao, Sanja Fidler, Adela Barriuso, Antonio Torralba, Bolei Zhou, Hang Zhao. Scene parsing through ade20k dataset. In CVPR, 2017.

Andrew Brock, Jeff Donahue, and Karen Simonyan. Large scale GAN training for high fidelity natural image synthesis. In ICLR, 2019.

Xi Chen, Yan Duan, Rein Houthooft, John Schulman, Ilya Sutskever, and Pieter Abbeel. Infogan: Interpretable representation learning by information maximizing generative adversarial nets. In NeurIPS, 2016.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In CVPR, 2016.

CVPR-FGVC5. https://www.kaggle.com/c/imaterialist-challenge-furniture-2018. 2018.

Max Welling, Diederik P Kingma. Auto-encoding variational bayes. In ICLR, 2014.

Ian Goodfellow. NeurIPS 2016 tutorial: Generative adversarial networks. arXiv preprint arXiv:1701.00160, 2016.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In NeurIPS, 2014.

Shuyang Gu, Jianmin Bao, Hao Yang, Dong Chen, Fang Wen, and Lu Yuan. Mask-guided portrait editing with conditional gans. In CVPR, 2019.

Ishaan Gulrajani, Faruk Ahmed, Martin Arjovsky, Vincent Dumoulin, and Aaron C Courville. Improved training of wasserstein gans. In NeurIPS, 2017.

Martin Heusel, Hubert Ramsauer, Thomas Unterthiner, Bernhard Nessler, Gunter Klambauer, and Sepp Hochreiter. Gans trained by a two time-scale update rule converge to a local nash equilibrium. In NeurIPS, 2017.

Tobias Hinz, Stefan Heinrich, and Stefan Wermter. Generating multiple objects at spatially distinct locations. In ICLR, 2019.

Rui Huang, Shu Zhang, Tianyu Li, and Ran He. Beyond face rotation: Global and local perception gan for photorealistic and identity preserving frontal view synthesis. In ICCV, 2017.

Phillip Isola, Jun-Yan Zhu, Tinghui Zhou, and Alexei Efros. Image-to-image translation with conditional adversarial networks. In CVPR, 2017.

Justin Johnson, Alexandre Alahi, and Li Fei-Fei. Perceptual losses for real-time style transfer and super-resolution. In ECCV, 2016.

Justin Johnson, Agrim Gupta, and Li Fei-Fei. Image generation from scene graphs. In CVPR, 2018.

Tero Karras, Timo Aila, Samuli Laine, and Jaakko Lehtinen. Progressive growing of gans for improved quality, stability, and variation. ICLR, 2018. Part 1.

Tero Karras, Timo Aila, Samuli Laine, and Jaakko Lehtinen. Progressive growing of gans for improved quality, stability, and variation. ICLR, 2018. Part 2.

Tero Karras, Samuli Laine, and Timo Aila. A style-based generator architecture for generative adversarial networks. In CVPR, 2019.

Cheng-Han Lee, Ziwei Liu, Lingyun Wu, and Ping Luo. Maskgan: Towards diverse and interactive facial image manipulation. InIEEE Conference on Computer Vision and Pattern Recognition (CVPR), 2020.

Kathleen M Lewis, Srivatsan Varadharajan, and Ira Kemelmacher-Shlizerman. Vogue: Try-on by stylegan interpolation optimization. arXiv preprint arXiv:2101.02285.

Peipei Li, Yibo Hu, Qi Li, Ran He, and Zhenan Sun. Global and local consistent age generative adversarial networks. In CVPR, 2018.

Tsung-Yi Lin, Piotr Dollar, Ross Girshick, Kaiming He, Bharath Hariharan, and Serge Belongie. Feature pyramid networks for object detection. In CVPR, 2017.

Takeru Miyato and Masanori Koyama. cgans with projection discriminator. In ICLR, 2018.

Taesung Park, Ming-Yu Liu, Ting-Chun Wang, and Jun-Yan Zhu. Semantic image synthesis with spatially-adaptive normalization. InCVPR, 2019.

Zhu, Peihao et al; Sean: Image synthesis with semantic region-adaptive normalization. In CVPR, 2020. Part 1.

Zhu, Peihao et al; Sean: Image synthesis with semantic region-adaptive normalization. In CVPR, 2020. Part 2.

Bernt Schiele, Pietro Perona, Piotr Dollar, Christian Wojek. Pedestrian detection: A benchmark. InCVPR, 2009.

Kripasindhu Sarkar, Vladislav Golyanik, Lingjie Liu, and Christian Theobalt. Style and pose control for image synthesis of humans from a single monocular view. In ArXiv:2102.11263, 2021.

K. Simonyan and A. Zisserman. Very Deep Convolutional Networks for Large-Scale Image Recognition. In ICLR, 2015.

Krishna Kumar Singh, Utkarsh Ojha, and Yong Jae Lee. FineGAN: Unsupervised hierarchical disentanglement for fine-grained object generation and discovery. In CVPR, 2019.

Vadim Sushko, Edgar Schonfeld, Dan Zhang, Juergen Gall, Bernt Schiele, and Anna Khoreva. You only need adversarial supervision for semantic image synthesis. InICLR, 2021.

Hao Tang, Dan Xu, Yan Yan, Philip H. S. Torr, and Nicu Sebe. Local class-specific and global image-level generative adversarial networks for semantic-guided scene generation. In CVPR, 2020.

Miika Aittala, Janne Hellsten, Jaakko Lehtinen, Timo Aila, Tero Karras, Samuli Laine. Analyzing and improving the image quality of stylegan. In CVPR, 2020.

Ting-Chun Wang, Ming-Yu Liu, Jun-Yan Zhu, Andrew Tao, Jan Kautz, and Bryan Catanzaro. High-resolution image synthesis and semantic manipulation with conditional gans. In CVPR, 2018.

Yuxin Wu, Alexander Kirillov, Francisco Massa, Wan-Yen Lo, and Ross Girshick. Detectron2. https://github.com/facebookresearch/detectron2, 2019.

Jing Shao, Xiaogang Wang, Hongsheng Li, Xihui Liu, Guojun Yin. Learning to predict layout-to-image conditional convolutions for semantic image synthesis. In NeurIPS, 2019.

Jianwei Yang, Anitha Kannan, Dhruv Batra, and Devi Parikh. Lr-gan: Layered recursive generative adversarial networks for image generation.ICLR, 2017.

Han Zhang, Tao Xu, Hongsheng Li, Shaoting Zhang, and Dimitris Metaxas. Stackgan: Text to photo-realistic image synthesis with stacked generative adversarial networks. In ICCV, 2017.

Bolei Zhou, Agata Lapedriza, Aditya Khosla, Aude Oliva, and Antonio Torralba. Places: A 10 million image database for scene recognition.PAMI, 2017.

Jun-Yan Zhu, Taesung Park, Phillip Isola, and Alexei A. Efros. Unpaired image-to-image translation using cycle-consistent adversarial networks.ICCV, 2017.

Abdal, Rameen et al. "Image2StyleGAN: How to Embed Images Into the StyleGAN Latent Space?" 2019 IEEE/CVF International Conference on Computer Vision (ICCV) (2019): 4431-4440. Part 1.

Abdal, Rameen et al. "Image2StyleGAN: How to Embed Images Into the StyleGAN Latent Space?" 2019 IEEE/CVF International Conference on Computer Vision (ICCV) (2019): 4431-4440. Part 2.

(56) References Cited

OTHER PUBLICATIONS

Abdal, Rameen et al. "Image2StyleGAN: How to Embed Images Into the StyleGAN Latent Space?" 2019 IEEE/CVF International Conference on Computer Vision (ICCV) (2019): 4431-4440. Part 3.
Abdal, Rameen et al. "Image2StyleGAN: How to Embed Images Into the StyleGAN Latent Space?" 2019 IEEE/CVF International Conference on Computer Vision (ICCV) (2019): 4431-4440. Part 4.
Abdal, R., Qin, Y., & Wonka, P. (2020). Image2StyleGAN++: How to Edit the Embedded Images? In 2020 IEEE/CVF Conference on Computer Vision and Pattern Recognition (CVPR) IEEE. https://doi.org/10.1109/CVPR42600.2020.00832. Part 1.
Abdal, R., Qin, Y., & Wonka, P. (2020). Image2StyleGAN++: How to Edit the Embedded Images? In 2020 IEEE/CVF Conference on Computer Vision and Pattern Recognition (CVPR) IEEE. https://doi.org/10.1109/CVPR42600.2020.00832. Part 2.
Abdal, R. et al.; StyleFlow: Attribute-conditioned Exploration of StyleGAN-Generated Images using Conditional Continuous Normalizing Flows; ACM Transactions on Graphics vol. 40Issue 3Jun. 2021 Article No. 21pp 1-21https://doi.org/10.1145/3447648; Published May 6, 2021; Part 1.
Abdal, R. et al.; StyleFlow: Attribute-conditioned Exploration of StyleGAN-Generated Images using Conditional Continuous Normalizing Flows; ACM Transactions on Graphics vol. 40Issue 3Jun. 2021 Article No. 21pp 1-21https://doi.org/10.1145/3447648; Published May 6, 2021; Part 2.
Abdal, R. et al.; StyleFlow: Attribute-conditioned Exploration of StyleGAN-Generated Images using Conditional Continuous Normalizing Flows; ACM Transactions on Graphics vol. 40Issue 3Jun. 2021 Article No. 21pp 1-21https://doi.org/10.1145/3447648; Published May 6, 2021.
Part 3.
Hong et al; "Inferring Semantic Layout for Hierarchical Text-to-Image Synthesis"; Jun. 2018; 2018 IEEE/CVF Conference on Computer Vision and Pattern Recognition; pp. 7986-7994 (Year: 2018).
Tang et al; "Local Class-Specific and Global Image-Level Generative Adversarial Networks for Semantic-Guided Scene Generation" ;Jun. 19, 2020; 2020 IEEE/CVF Conference on Computer Vision and Pattern Recognition; pp. 7867-7876 (Year: 2020).
Zhu et al; "Semantically Multi-modal Image Synthesis"; Jun. 19, 2020; 2020 IEEE/CVF Conference on Computer Vision and Pattern Recognition; pp. 5466-5475 (Year: 2020).
Tang et al; "Dual Attention GANs for Semantic Image Synthesis"; Oct. 16, 2020; 2020 Association for Computing Machinery; pp. 1994-2002 (Year: 2020).
U.S. Appl. No. 17/400,474, filed Aug. 4, 2022, Office Action.
U.S. Appl. No. 17/400,474, filed Feb. 2, 2023, Notice of Allowance.

\* cited by examiner

GENERATING SYNTHESIZED DIGITAL IMAGES UTILIZING A MULTI-RESOLUTION GENERATOR NEURAL NETWORK

BACKGROUND

Advances in computer processing and machine learning have led to significant advancements in the field of digital image processing and generation. Specifically, machine-learning models and neural networks provide many different types of systems the ability to generate synthesized digital images to imitate specific images such as real-world images. For example, many systems utilize synthetic images to augment image databases to use for improving machine-learning models. Because the content of digital images in image training datasets has such a significant impact on the accuracy and performance of machine-learning models, ensuring that synthetically generated digital images accurately represent the intended content is an important aspect of image dataset augmentation.

Some existing image generation systems utilize generation neural networks (e.g., generative adversarial networks) to generate synthesized digital images in conditional settings. Specifically, these image generation systems generate images based on an input conditioning signal such as another image, a segmentation map, or other prior. For example, some existing image generation systems utilize a conditional generative adversarial network with spatially-adaptive normalization to generate synthesized digital images. While such systems can improve image quality during semantic image generation, the resulting quality is still inferior to the quality of unconditional generative adversarial networks. Additionally, these existing systems also typically generate synthesized digital images with limited resolution sizes that are not useful for real-world applications.

SUMMARY

This disclosure describes one or more embodiments of methods, non-transitory computer readable media, and systems that solve the foregoing problems (in addition to providing other benefits) by generating synthetized digital images via multi-resolution generator neural networks. Specifically, the disclosed systems extract multi-resolution features from a scene representation to condition a spatial feature tensor and a latent code to modulate an output of a generator neural network. For example, the disclosed systems utilize a base encoder of the generator neural network to generate a feature set from a semantic label map of a scene. The disclosed systems then utilize a bottom-up encoder to extract multi-resolution features and generate a latent code from the feature set. Furthermore, the disclosed systems determine a spatial feature tensor by utilizing a top-down encoder to up-sample and aggregate the multi-resolution features. The disclosed systems then utilize a decoder to generate a synthesized digital image based on the spatial feature tensor and the latent code. Accordingly, the disclosed systems provide improved accuracy in synthesized digital images and efficiency in image synthesis neural networks.

BRIEF DESCRIPTION OF THE DRAWINGS

The detailed description refers to the drawings briefly described below.

DETAILED DESCRIPTION

Figure 1:
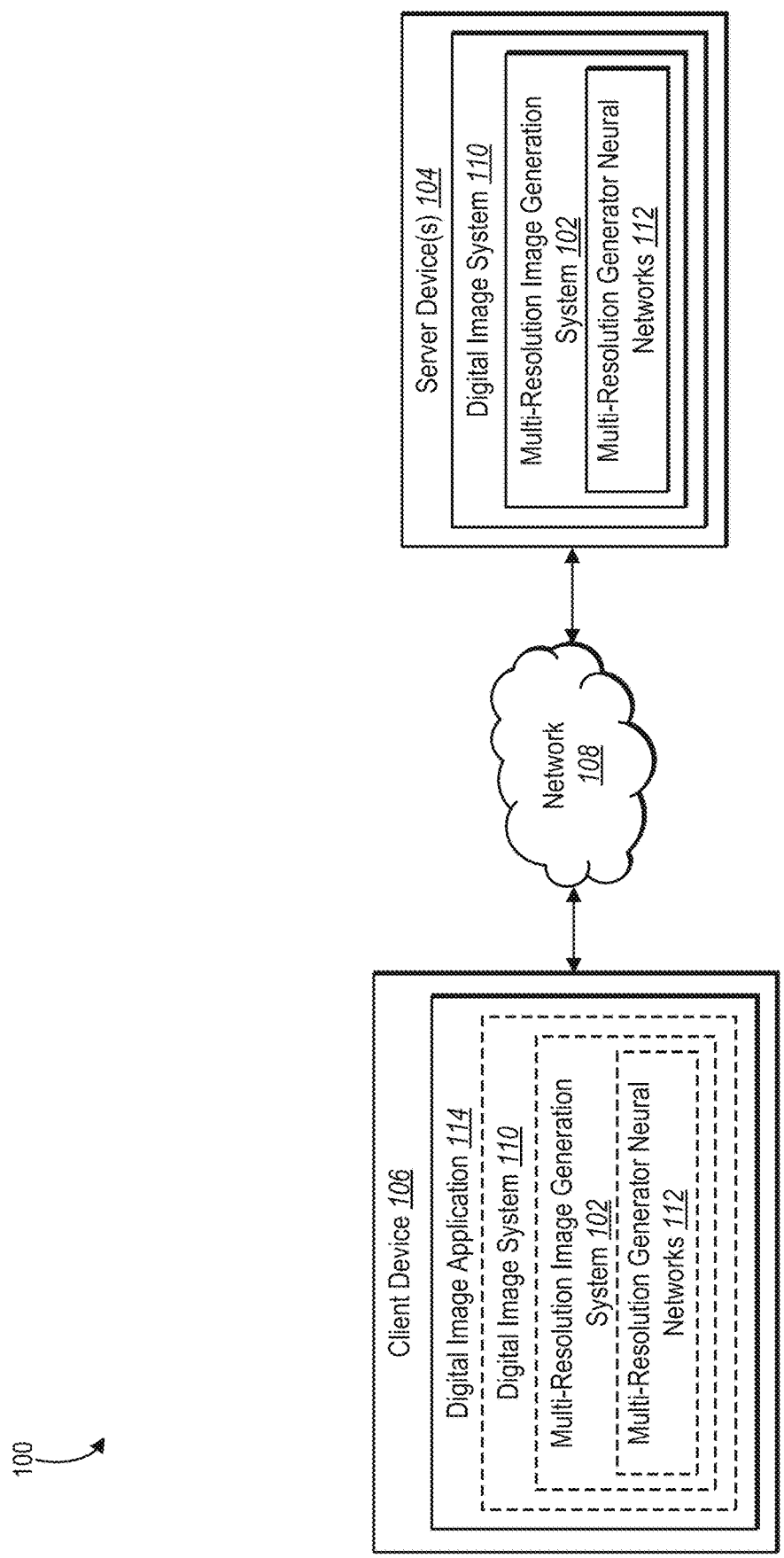
FIG. 1 illustrates a block diagram of a system environment in which a multi-resolution image generation system is implemented in accordance with one or more implementations.

This disclosure describes one or more embodiments of a multi-resolution image generation system that generates synthesized digital images utilizing a multi-resolution generator neural network. In one or more embodiments, the multi-resolution image generation system utilizes a bottom-up encoder of the multi-resolution generator neural network to extract multi-resolution features based on a semantic label map including a layout of a scene. The multi-resolution image generation system also utilizes the bottom-up encoder to generate a latent code from the multi-resolution features. Additionally, the multi-resolution image generation system utilizes a top-down encoder of the multi-resolution generator neural network to determine a spatial feature code by aggregating the multi-resolution features. The multi-resolution image generation system then generates a digital image from the spatial feature tensor and the latent code. By generating the spatial feature tensor and the latent code from multi-resolution features of scenes, the multi-resolution image generation system generates synthesized digital images with improved accuracy.

As mentioned, in one or more embodiments, the multi-resolution image editing system extracts multi-resolution features from a semantic label map representing a semantic layout of a scene. Specifically, the multi-resolution image editing system utilizes a base encoder of the multi-resolution generator neural network to generate a feature set from the semantic label map. The multi-resolution image editing system then utilizes a bottom-up encoder to extract the multi-resolution features from the previously extracted feature set. In particular, the multi-resolution image editing system utilizes a plurality of separate downsampling neural network layers in series to extract a plurality of additional feature sets at different resolutions.

Furthermore, in one or more embodiments, the multi-resolution image editing system determines a latent code from multi-resolution features extracted for a scene. In particular, the multi-resolution image editing system utilizes a set of fully connected neural network layers of the multi-resolution generator neural network to generate the latent code from a reduced resolution feature set. For instance, the multi-resolution image editing system utilizes the fully connected neural network layers to determine a statistical distribution including a mean value and a variance value based on the reduced resolution feature set. The multi-resolution image editing system generates the latent code based on the mean value and the variance value.

In one or more additional embodiments, the multi-resolution image editing system determines a spatial feature tensor for multi-resolution features extracted for a scene. For example, the multi-resolution image editing system utilizes a top-down encoder of the multi-resolution generator neural network to aggregate the multi-resolution features extracted by the bottom-up encoder. To illustrate, the top-down encoder includes a plurality of upsampling neural network layers that up-sample and aggregate, via lateral connections, a plurality of feature sets at a plurality of different resolutions. Accordingly, the multi-resolution image editing system generates a single, two-dimensional spatial feature tensor representing features of the scene at the different resolutions.

After determining a spatial feature tensor and a latent code from multi-resolution features of a semantic label map, the multi-resolution image editing system generates a synthesized digital image. Specifically, the multi-resolution image editing system utilizes a decoder of the multi-resolution generator neural network to generate the synthesized digital image from the spatial feature tensor and the latent code. In one or more embodiments, the decoder includes a mapping neural network layer to flatten and modify a distribution of the latent code based on a distribution of the decoder. The multi-resolution image editing system utilizes the decoder to generate the synthesized digital image based on the spatial feature tensor and the modified latent code.

In one or more embodiments, the multi-resolution image editing system utilizes a combined loss function to learn parameters of a multi-resolution generator neural network. In particular, the multi-resolution image editing system determines an encoder loss by modifying a latent code according to a reference distribution. The multi-resolution image editing system also determines a perceptual loss by comparing a synthesized digital image to a digital image comprising the digital image scene. Furthermore, the multi-resolution image editing system determines a generator loss based on an adversarial loss and one or more regularization losses associated with the decoder. The multi-resolution image editing system then modifies parameters of a based encoder, a bottom-up encoder, a top-down encoder, and a decoder of the multi-resolution generator neural network based on a combined loss including the encoder loss, the perceptual loss, and the generator loss.

The disclosed multi-resolution image editing system provides a number of benefits over conventional systems. For example, the multi-resolution image editing system improves the accuracy of computing systems that generate synthesized digital images. Specifically, conventional systems that utilize a generator neural network with spatially-adaptive normalization tend to allocate resources toward generating larger content such as background content and neglect details of smaller objects in the foreground. By generating a spatial feature tensor based on multi-resolution features of a semantic layout of a scene, the multi-resolution image editing system generates synthesized digital images. More specifically, the multi-resolution image editing system more accurately preserves spatial information due to the two-dimensional spatial feature tensor than via simple learnable constants, as in conventional systems.

Furthermore, the multi-resolution image editing system improves the flexibility of computing systems that generate synthesized digital images. In particular, as previously mentioned, conventional systems that rely on a generator neural network with spatially-adaptive normalization are limited to lower resolution image synthesis. The multi-resolution image editing system, however, utilizes a modified generator neural network structure that generates higher quality images that are easily scaled to high resolutions. More specifically, the multi-resolution image editing system utilizes an encoder to extract hierarchical feature representations at a plurality of different resolutions to modulate the generator neural network. Additionally, the multi-resolution image editing system utilizes the hierarchical feature representations to synthesize details of different sizes of objects/textures at different resolutions. Thus, the multi-resolution image editing system provides improved flexibility in generating objects in out-of-distribution/context scene layouts (e.g., by placing objects in locations those objects are not typically found).

In addition, the multi-resolution image editing system improves the efficiency of computing systems that train and implement generator neural networks for generating synthesized digital images. For example, conventional systems that utilize spatially-adaptive normalization to generate synthesized digital images can require significant resources and time to train generator neural networks. By utilizing an encoder to extract hierarchical feature representations in connection with generating a synthesized digital image (e.g., from a semantic label map) to modulate a generator neural network, the multi-resolution image editing system also results in a generator neural network that is less memory intensive and faster to train than the conventional generator neural networks.

Turning now to the figures, FIG. 1 includes an embodiment of a system environment 100 in which a multi-resolution image editing system 102. In particular, the system environment 100 includes server device(s) 104 and a client device 106 in communication via a network 108. Moreover, as shown, the server device(s) 104 include a digital image system 110, which includes the multi-resolution image generation system 102. Furthermore, FIG. 1 illustrates that the multi-resolution image generation system 102 includes a multi-resolution generator neural network 112. Additionally, the client device 106 includes a digital image application 114, which optionally includes the digital image system 110, the multi-resolution image generation system 102, and the multi-resolution generator neural network 112.

As shown in FIG. 1, the server device(s) 104 includes or hosts the digital image system 110. Specifically, the digital image system 110 includes, or is part of, one or more systems that implement digital image processing and/or digital image generation. For example, the digital image system 110 provides tools for viewing, generating, editing, and/or otherwise interacting with digital images (e.g., via the digital image application 114 of the client device 106). In one or more embodiments, the digital image system 110 processes digital content items including digital images and/or digital videos. To illustrate, the digital image system 110 utilizes neural networks to generate and/or modify synthesized digital images. In one or more embodiments, the digital image system 110 generates datasets of synthesized digital images or digital videos in connection with training neural networks or machine-learning models (e.g., segmentation neural networks, generator neural networks). In one or more additional embodiments, the digital image system 110 processes digital images in connection with one or more additional systems such as cloud-storage systems.

In connection with generating or modifying digital images, the digital image system 110 includes the multi-resolution image generation system 102 to generate synthesized digital images. In particular, the multi-resolution image generation system 102 utilizes the multi-resolution generator neural networks 112 to generate a synthesized digital image utilizing multi-resolution features of a scene. For example, the multi-resolution image generation system 102 generates a synthesized digital image by utilizing a plurality of network layers to extract and modify a plurality of multi-resolution features associated with a scene.

More specifically, the multi-resolution image generation system 102 utilizes an encoder of the multi-resolution generator neural network 112 to extract features at different resolutions based on a semantic label map or other prior that indicates a structure or layout of objects in the scene. Additionally, the multi-resolution image generation system 102 utilizes the encoder of the multi-resolution generator neural network 112 to determine a spatial feature tensor and a latent code based on the multi-resolution features. The multi-resolution image generation system 102 then utilizes a decoder of the multi-resolution generator neural network 112 to synthesize a digital image from the spatial feature tensor and the latent code. Accordingly, the multi-resolution image generation system 102 generates a synthesized digital image to include foreground and background objects organized in a semantic layout based on the semantic label map.

In one or more embodiments, a synthesized digital image includes a digital image that is at least partially generated by a neural network. In particular, a synthesized digital image includes a digital image created from one or more priors indicating positions and classes of objects. For instance, a synthesized digital image is a digital image generated by a generator neural network based on a semantic label map. In one or more embodiments, a generator neural network further generates a synthesized digital image based on an edge map indicating edges of objects. According to some embodiments, a synthesized digital image includes a digital image representation of a real-world scene generated by a neural network.

In one or more embodiments, a semantic label map includes a representation of labels for a plurality of objects within a digital image. To illustrate, a semantic label map includes a plurality of values indicating object classes for a plurality of pixels in a digital image. Thus, a semantic label provides information indicating positions and classes of a plurality of background and/or foreground objects within a digital image.

In one or more embodiments, a neural network includes a computer representation that is tunable based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a convolutional neural network, a recurrent neural network, a residual neural network, or an adversarial neural network. To illustrate, a neural network includes a generator neural network for generating synthesized digital images. In one or more embodiments, a generator neural network includes a generative adversarial network with one or more encoders or decoders including residual neural network layers, linear neural network layers, rectified linear unit neural network layers, and/or other neural network layers. Accordingly, generator neural networks described herein provide operations for generating synthesized digital images and/or portions of synthesized digital images.

Furthermore, in one or more embodiments, an object includes a visible item with a definable boundary relative to other visible items in a scene. For example, an object includes an item in a foreground of a scene including, but not limited to, real-world items such as furniture, people, faces, clothing, buildings, vehicles, or the like. Additionally, in one or more embodiments, an object includes a portion of a larger object (i.e., a subcomponent of an object) such as a particular body part or a vehicle component. In some embodiments, a digital image includes a plurality of foreground objects presented according to a particular perspective such that one or more of the objects overlap one or more other objects in a scene.

Additionally, as mentioned, each object in a digital image corresponds to an object class indicated by a semantic label map. In one or more embodiments, an object class includes a particular category of object. For instance, an object class includes a label or description indicating the category of the object from a plurality of possible categories. To illustrate, an object class includes, but is not limited to, a particular real-world item such as furniture, person, face, clothing item, building, vehicle, etc. In additional embodiments, an object class corresponds to a particular subcomponent of another object such as a particular body part (e.g., face or limb) or a particular clothing item.

In one or more embodiments, the server device(s) 104 include a variety of computing devices, including those described below with reference to FIG. 9. For example, the server device(s) 104 includes one or more servers for storing and processing data associated with synthesized digital images. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 9. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, generating, viewing, modifying, and otherwise interacting with digital images or datasets of digital images via the digital image application 114. The client device 106 also performs functions for generating, capturing, or accessing data to provide to the digital image system 110 and the multi-resolution image generation system 102 in connection with generating and modifying digital images. For example, the client device 106 communicates with the server device(s) 104 via the network 108 to provide digital images to the server device(s) 104 or receiving digital images from the server device(s) 104. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, in alternative embodiments, the various components of the multi-resolution image generation system 102 communicate and/or interact via other methods (e.g., the server device(s) 104 and the client device 106 can communicate directly). Furthermore, although FIG. 1 illustrates the multi-resolution image generation system 102 being implemented by a particular component and/or device within the system environment 100, the multi-resolution image generation system 102 can be implemented, in whole or in part, by other computing devices and/or components in the system environment 100 (e.g., the client device 106). Additionally, the server device(s) 104 and/or the client device 106 may access synthesized digital images from a third-party system via the network 108.

In particular, in some implementations, the multi-resolution image generation system 102 on the server device(s) 104 supports the multi-resolution image generation system 102 on the client device 106. For instance, the multi-resolution image generation system 102 on the server device(s) 104 learns parameters for the multi-resolution generator neural network 112. The multi-resolution image generation system 102 then, via the server device(s) 104, provides the multi-resolution generator neural network 112 to the client device 106. In other words, the client device 106 obtains (e.g., downloads) the multi-resolution generator neural network 112 with the learned parameters from the server device(s) 104. Once downloaded, the client device 106 can utilize the multi-resolution generator neural network 112 to perform one or more image editing tasks independent from the server device(s) 104.

In alternative implementations, the multi-resolution image generation system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform an image generation task utilizing the multi-resolution image generation system 102, and, in response, the multi-resolution image generation system 102 on the server device(s) 104 performs the task. The server device(s) 104 then provides the output or results of the image generation task to the client device 106.

Figure 2:
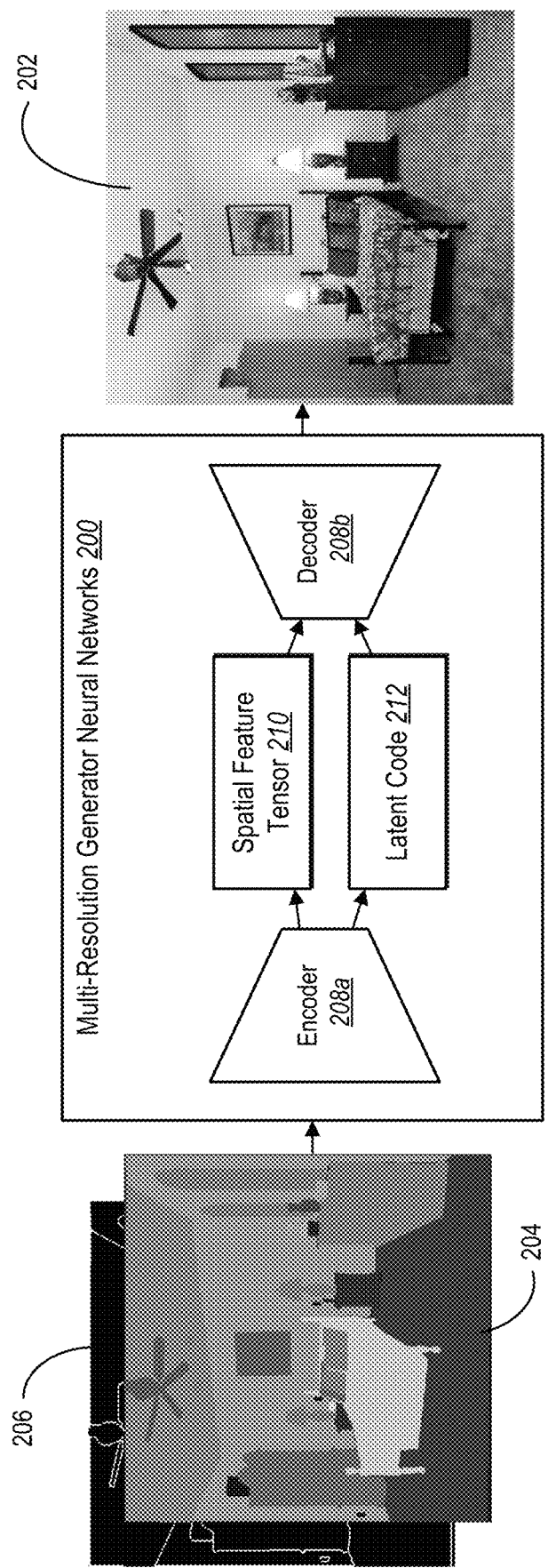
FIG. 2 illustrate diagrams of the multi-resolution image generation system generating synthesized digital images in accordance with one or more implementations.

In one or more embodiments, the multi-resolution image generation system 102 accurately, flexibly, and efficiently generates synthesized digital images. Specifically, the multi-resolution image generation system 102 generates synthesized digital images based on multi-resolution features of objects in a scene. FIG. 2 illustrates that the multi-resolution image generation system 102 utilizes a multi-resolution generator neural network to extract multi-resolution features from a semantic label map and then generate a synthesized digital image.

As mentioned, FIG. 2 illustrates that the multi-resolution image generation system 102 utilizes a multi-resolution generator neural network 200 to generate a synthesized digital image 202 from one or more priors. In one or more embodiments, the multi-resolution image generation system 102 utilizes the multi-resolution generator neural network 200 to generate the synthesized digital image 202 from a semantic label map 204. For instance, the semantic label map 204 includes a plurality of semantic labels indicating object classes for a plurality of objects at locations in a two-dimensional space for a scene.

In one or more additional embodiments, the multi-resolution image generation system 102 further generates the synthesized digital image 202 based on an edge map 206 in connection with the semantic label map 204. Specifically, the edge map 206 includes edges of objects determined using one or more edge detection techniques. Thus, in one or more embodiments, the multi-resolution generator neural network 200 utilizes the edge map 206 in connection with the semantic label map 204 to generate the synthesized digital image 202 with improved accuracy over the semantic label map 204 alone.

According to one or more embodiments, the semantic label map 204 includes semantic information that indicates a position and class of one or more objects for generating the synthesized digital image 202. In particular, the multi-resolution generator neural network 200 utilizes labels of the semantic label map 204 to determine object classes corresponding to a plurality of pixels for generating the synthesized digital image 202. For instance, the semantic label map 204 includes groups of pixels associated with a particular object class indicating a location and a category of an object. Additionally, in one or more embodiments, the multi-resolution generator neural network 200 utilizes the edge map 206 including edges of objects in connection with the semantic label map 204 to generate the synthesized digital image 202 with improved accuracy over the semantic label map 204 alone. Although FIG. 2 illustrates that the multi-resolution image generation system 102 utilizes the multi-resolution generator neural network 200 to generate the synthesized digital image 202 from the semantic label map 204 and the edge map 206, in other embodiments, the multi-resolution image generation system 102 generates the synthesized digital image 202 from another prior, such as another digital image (e.g., a photograph).

In one or more embodiments, the multi-resolution image generation system 102 utilizes the multi-resolution generator neural network 200 to synthesize a plurality of foreground and background objects in a scene corresponding to a layout of the semantic label map 204. For example, the multi-resolution image generation system 102 utilizes the multi-resolution generator neural network 200 to generate features for objects such as furniture (e.g., a bed) in a scene that includes one or more additional objects in the foreground and/or background of the scene. Accordingly, the multi-resolution image generation system 102 utilizes the multi-resolution generator neural network 200 to generate the synthesized digital image 200 to include objects corresponding to the scene in the semantic label map 204.

As mentioned, the multi-resolution image generation system 102 utilizes the multi-resolution generator neural network 200 to generate features corresponding to objects in a scene. In particular, as illustrated in FIG. 2, the multi-resolution generator neural network 200 includes an encoder 208a to encode information about the objects from the semantic label map 204 and the edge map 206. For instance, the multi-resolution generator neural network 200 utilizes the encoder 208a to extract multi-resolution features from the semantic label map 204 and the edge map 206. Furthermore, in one or more embodiments, the multi-resolution generator neural network 200 includes a decoder 208b to decode the encoded information about objects in the scene corresponding to the semantic label map 204 and generate the synthesized digital image 202.

As shown, the multi-resolution image generation system 102 utilizes a conditional GAN (as the multi-resolution generator neural network) that utilizes a neural network encoder 208a to convert a prior (e.g., a semantic label map 204 and optionally an edge map 206) into a latent code and a spatial feature tensor. Subsequently, in some embodiments, the multi-resolution image generation system 102 uses a neural network decoder 208b to convert the latent code and spatial feature tensor into a synthesized digital image.

Moreover, as used herein, the term latent code refers to data that embeds latent (or hidden) features that, when processed by the decoder 208b, converts into a digital image depicting a scene based on the prior used to generate the latent code. For instance, a latent code includes one or more latent-feature vectors or one or more noise maps that, when utilized by the multi-resolution generator neural network 200, convert into a synthesized digital image. In some instances, a latent code includes a Z-vector of a GAN as described by R. Abdal et al. in *A Style-Based StyleFlow: Attribute-conditioned Exploration of StyleGAN-Generated Images using Conditional Continuous Normalizing Flows*, arXiv:2008.02401, (2020), the content of which is hereby incorporated by reference in its entirety (hereinafter *A Style-Based StyleFlow*); or as described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety (hereinafter Karras). In addition, in one or more embodiments, a latent code includes a latent-feature vector and/or a noise map from a latent-noise space as described by R. Abdal et al. in *Image2StyleGAN. How to embed images into the stylegan latent space?*, In Proceedings of the IEEE International Conference on Computer Vision, pages 4432-4441, 2019, the content of which is hereby incorporated by reference in its entirety (hereinafter *Image2StyleGAN*). Furthermore, in certain instances, a latent code is within a latent space (WN latent-noise space and/or $W^+N$ latent-noise space) as described by R. Abdal et al. in *Image2StyleGAN++: How to edit the embedded images?*, In Proceedings of the IEEE International Conference on Computer Vision, pages 8296-8305, 2020, the content of which is hereby incorporated by reference in its entirety (hereinafter *Image2StyleGAN++*). Moreover, in one or more embodiments, the multi-resolution image generation system 102 generates a latent code by projecting a prior into a latent space.

In one or more embodiments, as illustrated in FIG. 2, the multi-resolution image generation system 102 utilizes the encoder 208a of the multi-resolution generator neural network 200 to generate a representation of the multi-resolution features of the semantic label map 204 and the edge map 206. For example, the encoder 208a extracts a plurality of different feature sets based on the semantic label map 204 and the edge map 206 at a plurality of different resolutions. The encoder 208a utilizes the multi-resolution features to generate a spatial feature tensor 210 and a latent code 212 via a plurality of different neural network layers. The multi-resolution image generation system 102 then utilizes the decoder 208b to generate the synthesized digital image 202 based on the spatial feature tensor 210 and the latent code 212.

Figure 3A:
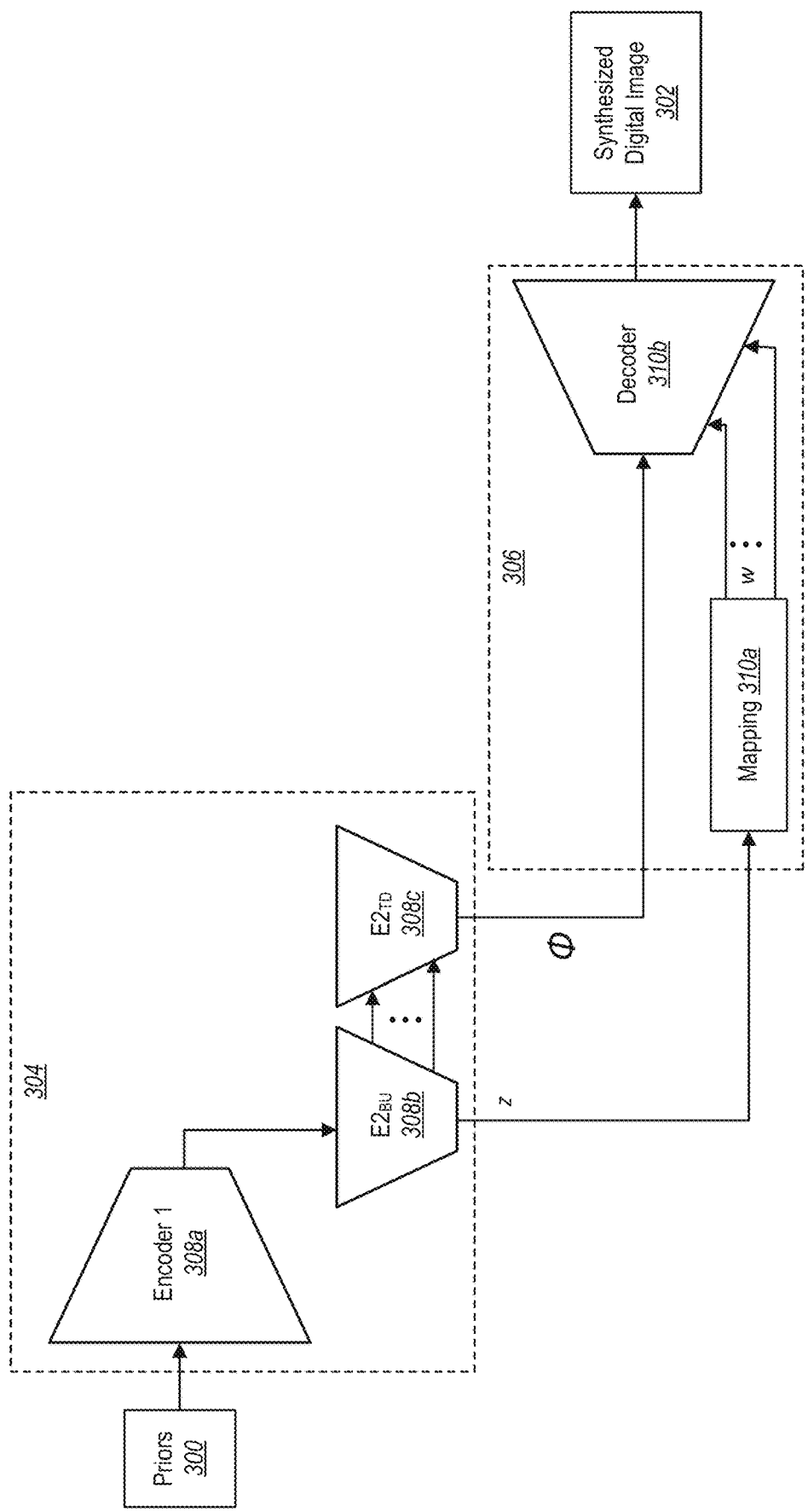
FIGS. 3A-3C illustrate diagrams of architecture of generator neural networks and components of generator neural networks in accordance with one or more implementations.
Figure 3B:
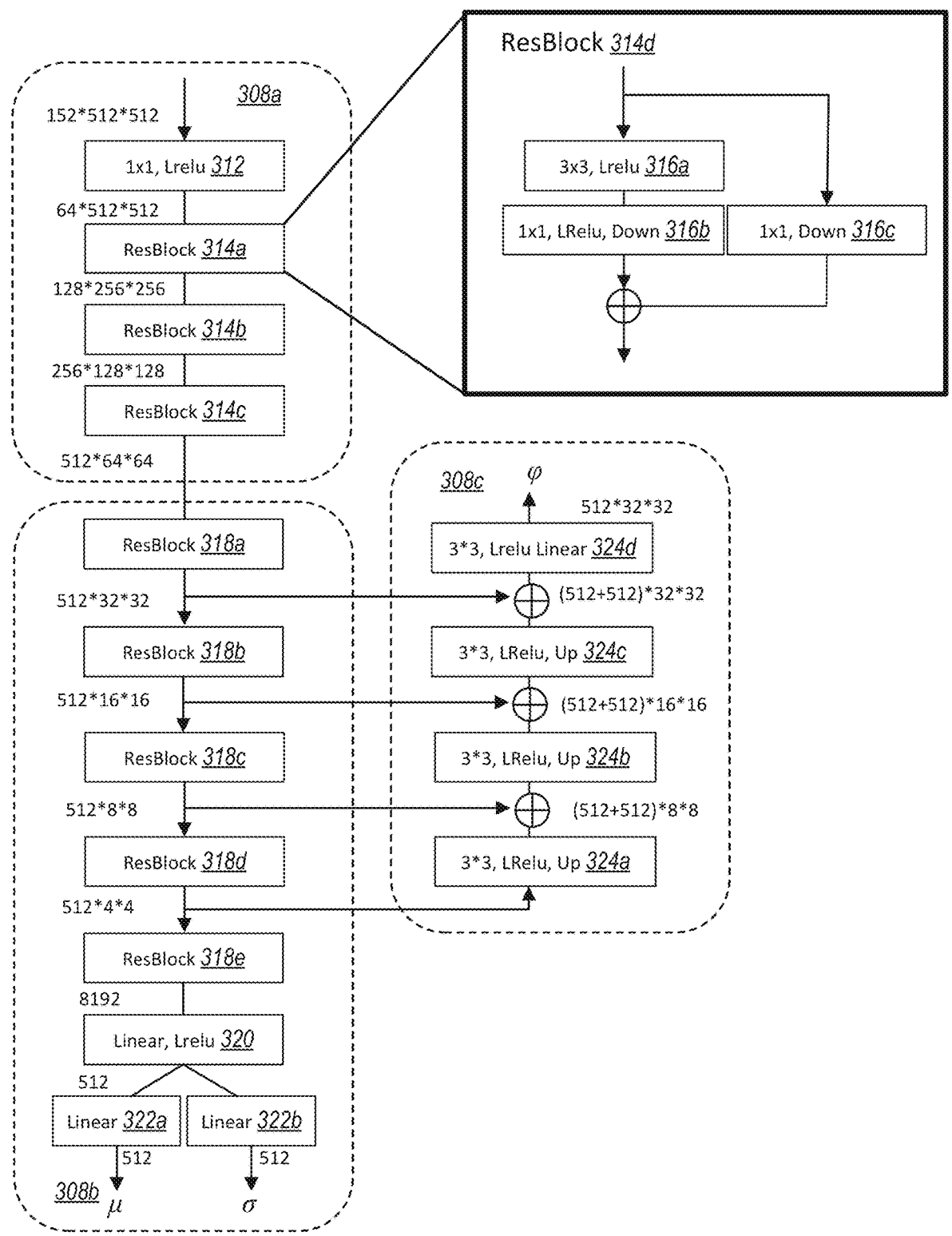
Figure 3C:
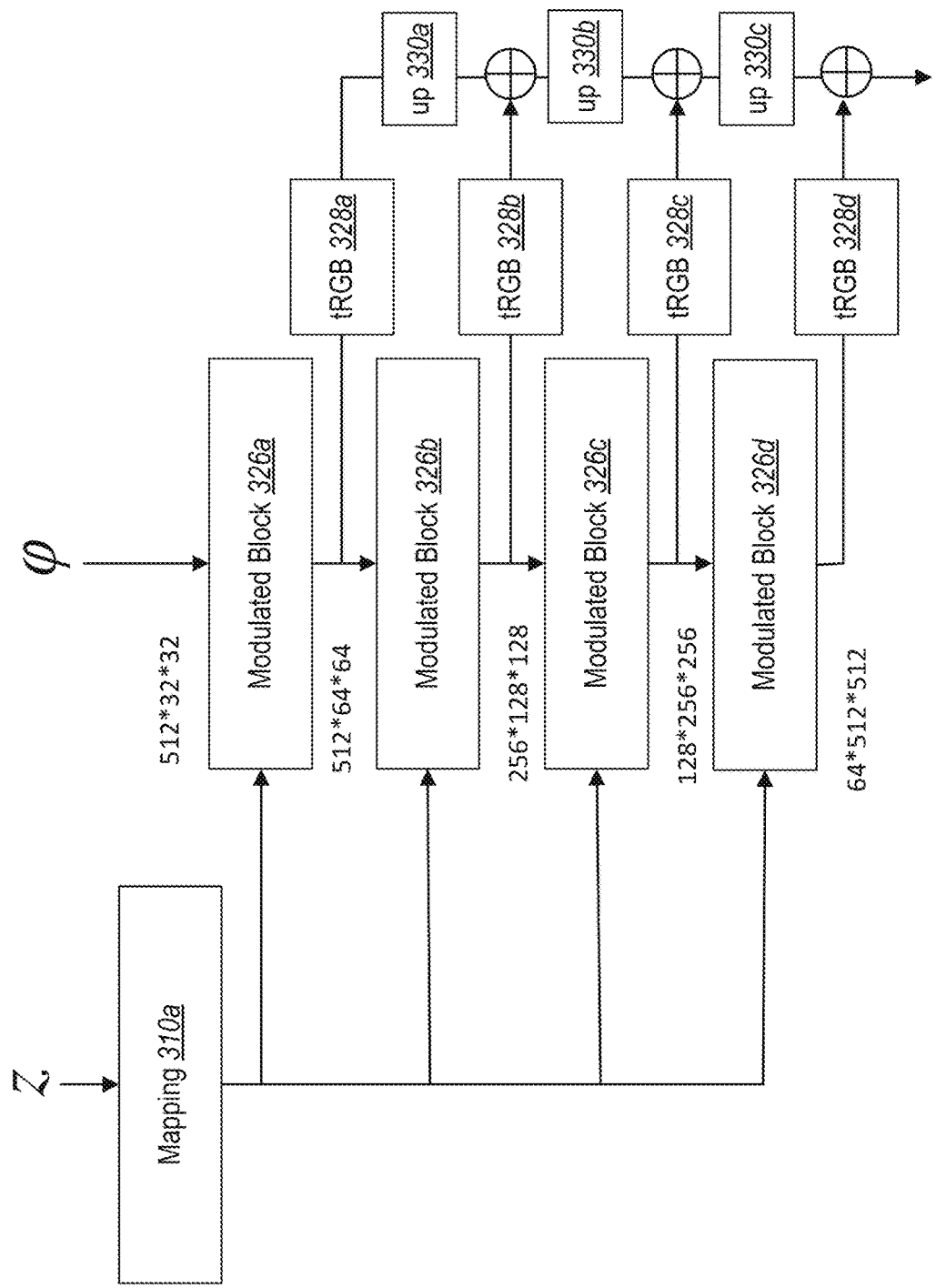

In addition, FIGS. 3A-3C illustrate detailed diagrams of architectures of a multi-resolution generator neural network and components of the multi-resolution generator neural network. Specifically, FIG. 3A illustrates a diagram of a multi-resolution generator neural network that the multi-resolution image editing system 102 utilizes to process priors 300 (e.g., a semantic label map) to generate a synthesized digital image 302 consistent with a semantic layout of objects in a scene. FIG. 3B illustrates a diagram of components of an encoder of the multi-resolution generator neural network. Furthermore, FIG. 3C illustrates a diagram of a decoder of the multi-resolution generator neural network.

In one or more embodiments, as illustrated in FIG. 3A, a multi-resolution generator neural network includes an encoder 304 and a decoder 306. As shown, the encoder 304 includes a plurality of components, and the decoder 306 also includes a plurality of components. According to one or more embodiments, the encoder 304 encodes information and generates one or more signals (e.g., a spatial feature tensor and a latent code) based on the priors 300. For instance, the priors 300 include object labels and positions to provide a semantic layout of a scene to the encoder 304. Furthermore, the decoder 306 utilizes the signals generated by the encoder 304 to generate the synthesized digital image 302.

As illustrated in FIG. 3A, the encoder 304 includes a base encoder 308a ("E2") to determine an initial representation based on the priors 300. In one or more embodiments, the base encoder 308a includes one or more neural network layers to convert the priors 300 into a feature vector of a fixed length by extracting feature sets based on the priors 300. For example, the base encoder 308a includes one or more neural network layers to downscale a resolution of the feature vector to a first lowered resolution.

FIG. 3A further illustrates that the encoder 304 includes a bottom-up encoder 308b ("$E2_{BU}$") and a top-down encoder 308c ("$E2_{TD}$"). According to one or more embodiments, the bottom-up encoder 308b further lowers a resolution of the feature vector extracted from the priors 300. In particular, the bottom-up encoder 308b receives the output of the base encoder 308a and then utilizes one or more neural network layers in a "bottom-up" configuration to reduce the resolution of the feature vector to a second lowered resolution. For example, the bottom-up encoder 308b generates a plurality of feature vectors with sequentially lowered resolutions (e.g., stepping a resolution down in several increments of neural network layers). Furthermore, the bottom-up encoder 308*b* also utilizes one or more neural network layers to generate a latent code based on a feature vector with a lowered resolution.

In one or more embodiments, the top-down encoder 308*c* of the encoder 304 utilizes a plurality of feature vectors at a plurality of different resolutions to generate a spatial feature tensor ϕ based on the priors 300. For instance, the top-down encoder 308*c* includes a plurality of neural network layers in a "top-down" configuration for upsampling by aggregating a plurality of feature vectors or feature sets at different resolutions (e.g., by merging features from $E2_{TD}$ with the feature maps of the same spatial dimension from $E2_{BU}$). The top-down encoder 308*c* thus incorporates information for generating the synthesized digital image 302 at a plurality of different resolutions to capture different levels of details. To illustrate, lower resolution features are semantically stronger and have more global information about all classes present in the priors 300, while higher resolutions features are more accurately aligned to the input layout.

As illustrated in FIG. 3A, the decoder 306 includes a mapping component 310*a* to transform a latent code z generated by the encoder 304. For example, the mapping component 310*a* utilizes one or more neural network layers to modify the latent code while maintaining the same dimensionality. Additionally, the mapping component 310*a* transforms the latent code to convert a normal distribution (or other distribution resulting from generating the latent code from the priors 300) to a distribution that better matches a training dataset associated with training the decoder 306. The multi-resolution image generation system 102 thus ensures that a decoder component 310*b* accurately interprets the encoded data associated with the priors 300.

Additionally, FIG. 3A illustrates that the decoder 306 includes a decoder component 310*b* to generate the synthesized digital image 302. In one or more embodiments, the decoder component 310*b* generates the synthesized digital image 302 from the spatial feature tensor generated by the encoder 304. Furthermore, the decoder component 310*b* utilizes the modified latent code from the mapping component 310*a* to generate the synthesized digital image 302 according to the modified distribution, thereby aligning the data in the spatial feature tensor to the training data associated with the generator neural network. In some embodiments, the decoder component 310*b* generates the synthesized digital image 302 as a base synthesized digital image for use in one or more additional image synthesis processes or other image modification processes.

As mentioned, FIG. 3B illustrates additional detail associated with the architecture of the encoder 304 of the multi-resolution generator neural network. Specifically, FIG. 3B illustrates that the base encoder 308*a* includes a plurality of neural network layers for generating an initial feature set based on an input. For instance, the base encoder 308*a* includes a convolutional neural network layer 312 (e.g., a 1×1 convolutional neural network layer) to convert a semantic label map, edge map, and/or other prior including a semantic layout of a scene into a fixed feature set. To illustrate, the convolutional neural network layer 312 (and/or one or more additional neural network layers) converts the prior(s) into a 64-channel feature set representing the visual features from the prior(s).

In one or more embodiments, after generating a feature set with reduced resolution via the convolutional neural network layer 312, the base encoder 308*a* includes a series of residual blocks 314*a*-314*c* of residual neural network layers. In particular, as shown in FIG. 3B, the series of residual blocks 314*a*-314*c* to further encode information from the feature set generated by the convolutional neural network layer 312 into a plurality of feature sets with reduced resolutions. More specifically, the base encoder utilizes the convolutional neural network layer 312 and the series of residual blocks 314*a*-314*c* to generate the initial (e.g., 64-channel) feature set from the input to the base encoder 308*a*.

Additionally, FIG. 3B illustrates a detailed view of a residual block 314*d* including a plurality of neural network layers for use within the multi-resolution generator neural network. For example, the residual block 314*d* corresponds to each of the residual blocks in the series of residual blocks 314*a*-314*c*. In one or more embodiments, the residual block 314*d* includes at least one 3×3 leaky rectified linear unit layer 316*a* ("LRelu") and a 1×1 LRelu downsampling layer 316*b* in series with an additional 1×1 downsampling layer 316*c* in parallel to generate a feature set down-sampled from the input to the residual block 314*d*. Thus, the series of residual blocks 314*a*-314*c* reduce the resolution of the feature set from the convolutional neural network layer 312 via a plurality of sequential downsampling layers to generate an initial feature set.

Additionally, as illustrated in FIG. 3B, the bottom-up encoder 308*b* utilizes the initial feature set generated via the base encoder 308*a* to generate multi-resolution feature sets. Specifically, FIG. 3B illustrates that the bottom-up encoder 308*b* includes an additional series of residual blocks 318*a*-318*d* to generate additional feature sets at a plurality of resolutions. For instance, the bottom-up encoder 308*b* includes a first residual block 318*a*, a second residual block 318*b*, a third residual block 318*c*, and a fourth residual block 318*d* in series.

In one or more embodiments, the first residual block 318*a* generates a first feature set at a first reduced resolution based on the initial feature set generated by the base encoder 308*a*. Additionally, the second residual block 318*b* generates a second feature set at a second reduced resolution based on the first feature set generated by the first residual block 318*a*. Similarly, the third residual block 318*c* generates a third feature set based on the second feature set, and the fourth residual block 318*d* generates a fourth feature set based on the third feature set in sequence. Thus, in one or more embodiments, the bottom-up encoder 308*b* utilizes a plurality of neural network layers (or neural network blocks) to extract a plurality of different features at different resolutions.

Furthermore, in one or more embodiments, the bottom-up encoder 308*b* also includes a plurality of neural network layers to generate a latent code in connection with the multi-resolution features. In particular, as illustrated in FIG. 3B, the bottom-up encoder 308*b* includes an additional residual block 318*e*, a linear LRelu layer, and a plurality of additional linear neural network layers 322*a*-322*b* in parallel. According to one or more embodiments, the bottom-up encoder utilizes the additional residual block 318*e*, the linear LRelu layer 320, and the plurality of additional linear neural network layers 322*a*-322*b* to generate the latent code capturing distribution information associated with a semantic layout of a scene. In some embodiments, the additional residual block 318*e*, the linear LRelu layer 320, and the plurality of additional linear neural network layers 322*a*-322*b* include fully connected layers to capture the distribution information.

For instance, the multi-resolution generator neural network utilizes the additional residual block 318*e* and the linear LRelu layer 320 to flatten a feature set with a lowest resolution from the series of residual blocks 318*a*-318*d*. The multi-resolution generator neural network then utilizes a first linear neural network layer 322a to generate a mean value associated with the reduced resolution feature set (e.g., a 4×4 feature set). The multi-resolution generator neural network also utilizes a second linear neural network layer 322b to generate a variance value associated with the reduced resolution feature set. Accordingly, the multi-resolution generator neural network generates the mean value and the variance value to represent the distribution of features determined from the semantic label map.

As illustrated in FIG. 3B, the top-down encoder 308c of the multi-resolution generator neural network includes a plurality of neural network layers to up-sample and aggregate multi-resolution features. In one or more embodiments, the top-down encoder 308c includes a series of LRelu layers 324a-324d that combine and up-sample the multi-resolution features extracted by the bottom-up encoder 308b. According to one or more embodiments, the series of LRelu layers 324a-324d include upsampling neural network layers to up-sample feature sets. To illustrate, the top-down encoder 308c includes a first LRelu layer 324a, a second LRelu layer 324b, a third LRelu layer 324c, and a fourth LRelu layer 324d.

In one or more embodiments, as illustrated in FIG. 3B, the first LRelu layer 324a generates a first up-sampled feature set at a first up-sampled resolution based on the fourth feature set from the bottom-up encoder 308b. Additionally, the second LRelu layer 324b generates a second up-sampled feature set at a second up-sampled resolution based on the third feature set aggregated with the first up-sampled feature set (e.g., via lateral connections). Also, the third LRelu layer 324c generates a third up-sampled feature set at a third up-sampled resolution based on the second feature set aggregated with the second up-sampled resolution. Furthermore, the fourth LRelu layer 324d generates a fourth up-sampled feature set at a fourth up-sampled resolution based on the first feature set aggregated with the third up-sampled feature set.

FIG. 3B illustrates that the top-down encoder 308c thus generates an up-sampled feature set utilizing the series of LRelu layers 324a-324d that up-sample and aggregate multi-resolution features captured for a semantic layout of a scene. Accordingly, in one or more embodiments, the multi-resolution generator neural network captures different details of objects in a scene by leveraging the different feature resolutions. As mentioned, for example, the multi-resolution generator neural network captures global information about object classes from lower resolution features and localized features from the higher resolution features.

Although FIG. 3B illustrates that the components of the multi-resolution generator neural network include a particular number of neural network layers, in other embodiments, a multi-resolution generator neural network include a different number or type of neural network layers in one or more components. In additional embodiments, the encoder components include different types of neural network layers (e.g., different downsampling or upsampling neural network layers) with various activation layers.

As previously mentioned, FIG. 3C illustrates an embodiment of an architecture of a decoder of a multi-resolution generator neural network. In particular, as illustrated, the decoder receives the latent code z and the spatial feature tensor ϕ generated by the encoder of the multi-resolution generator neural network. In one or more embodiments, the decoder processes the latent code via a mapping component 310a and the spatial feature tensor via a series of modulated blocks 326a-326d to generate a synthesized digital image.

Specifically, FIG. 3C illustrates that the mapping component 310a processes the latent code to generate a plurality of signals to provide to each of the modulated blocks 326a-326d. In one or more embodiments, the mapping component 310a includes a normalization layer and a plurality of linear layers (e.g., eight fully connected layers) to transform the latent code. Accordingly, the mapping component 310a modifies a distribution of the latent code according to learned parameters of the decoder. The mapping component 310a then passes the modified latent code to each of the modulated blocks 326a-326d.

Furthermore, the modulated blocks 326a-326d modulate and up-sample the spatial feature tensor in a plurality of sequential operations based on the signals provided by the mapping component 310a. For example, each modulated block includes a modulation layer, a convolutional layer, and a normalization layer. In one or more embodiments, a first modulated block 326a receives the spatial feature tensor and then generates a first up-sampled feature representation with modulated features, a second modulated block 326b generates a second up-sampled feature representation based on the first up-sampled feature representation, etc.

As illustrated in FIG. 3C, the modulated blocks 326a-326d generate a plurality of up-sampled feature representations to provide to color conversion layers ("tRGB") 328a-328d that generate per-pixel color data for synthesizing a digital image. Furthermore, the decoder utilizes a plurality of upsampling layers 330a-330c to up-sample the resolution of the per-pixel color data at each stage for aggregating at a final up-sampled resolution. The decoder thus generates a synthesized digital image at the final up-sampled resolution according to the per-pixel color data generated at each stage of the decoder, which captures various features based on the incoming styles indicated via the spatial feature tensor and according to the latent code.

Although FIG. 3C illustrates a specific embodiment of a decoder for a multi-resolution generator neural network, in one or more other embodiments, the multi-resolution image generation system 102 utilizes decoders with different architectures. For instance, the decoder includes more or fewer modulated blocks or more or fewer layers within a mapping component. Additionally, in some embodiments, the decoder combines one or more of the layers with other layers (e.g., by combining aggregation processes into modulated blocks) or separates one or more layers into one or more additional components.

Figure 5:
FIG. 5 illustrates a comparison of synthesized digital images using multi-resolution features and synthesized digital images without using multi-resolution features in accordance with one or more implementations.

In one or more embodiments, the multi-resolution image generation system 102 utilizes one or more instances of a generator neural network to generate base synthesized digital images. For example, a base generator neural network receives a segmentation map S (e.g., a semantic label map) and an instance edge map E to generate a base image $I_b$ that covers a scene. More specifically, $I_b = G_b(\text{cat}(S, E))$, where cat(•,•) is a channel-wise concatenation. Furthermore, $G_b$ represents the base generator neural network including an encoder and decoder architecture, for example, as illustrated in FIG. 5. The multi-resolution image generation system 102 utilizes a spatial feature tensor as input to the decoder to provide the generator neural network with guidance on the generated spatial structure. By sampling different latent codes z, the generator neural network generates different results given the same segmentation map.

According to one or more embodiments, the multi-resolution image generation system 102 trains the multi-resolution generator neural network utilizing a plurality of losses. For instance, the multi-resolution image generation system 102 utilizes the multi-resolution generator neural network to generate a base image $I_b$ from a real image $I_{real\_scene}$ and its segmentation map S. In one or more embodiments, the multi-resolution image generation system 102 utilizes an adversarial loss, $R_1$ regularization, and path length regularization referred to as $\mathcal{L}_{gan}$. For the adversarial loss, the real distributions are $\{I_{real\_scene}\}$ (a real image) for the base generator neural network. The multi-resolution image generation system 102 also regularizes the encoder by applying KL-Divergence to the output of the encoder (e.g., the latent code z), thus forcing the latent code to follow a normal distribution to support multi-modal synthesis during inference, $\mathcal{L}_{kl}$. The multi-resolution image generation system 102 utilizes the perceptual loss: $\mathcal{L}_{perceptual} = \Sigma_i \|V_i(I_b) - V_i(I_{real\_scene})\|_1$, where $V_i(\cdot)$ represents the output of the $i_{th}$ layer of a pretrained convolutional neural network. Accordingly, the overall training loss is $\mathcal{L} = \mathcal{L}_{gan} + \lambda_1 * \mathcal{L}_{kl} + \lambda_2 * \mathcal{L}_{perceptual}$. In one or more embodiments, the loss weights and the frequency of regularization within $\mathcal{L}_{gan}$ are predetermined values (e.g., 0.01 and 1 for $\lambda_1$ and $\lambda_2$, respectively).

Figure 4A:
FIGS. 4A-4C illustrate comparisons between synthesized digital images generated by a conventional system and synthesized digital images generated by the multi-resolution image generation system in accordance with one or more implementations.
Figure 4B:
Figure 4C:
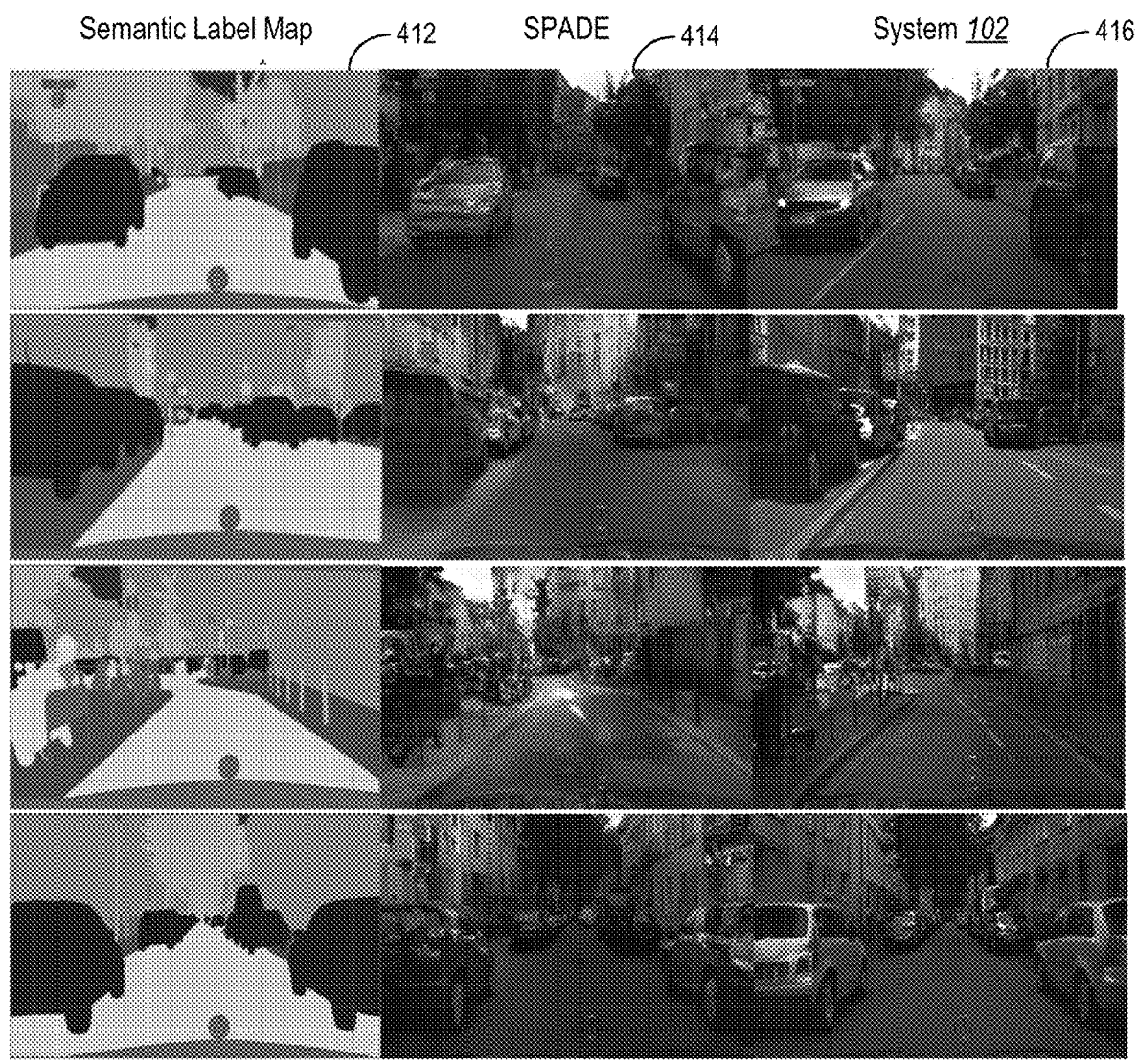

FIGS. 4A-4C illustrate a plurality of comparisons of digital images synthesized by the multi-resolution image generation system 102 utilizing a multi-resolution generator neural network and digital images synthesized by a conventional system. More specifically, the conventional system utilizes a generator neural network with spatially-adaptive normalization, as described by Taesung Park, Ming-Yu Liu, Ting-Chun Wnag, and Jun-Yan Zhu in "Semantic image synthesis with spatially-adaptive normalization" in Conference on Computer Vision and Pattern Recognition (2019) ("SPADE"), to generate synthesized digital images based on semantic label maps. Furthermore, the multi-resolution image generation system 102 and the conventional system generate synthesized digital images based on semantic label maps for a plurality of different scenes of a plurality of different datasets.

For instance, FIG. 4A illustrates a first semantic label map 400 corresponding to a scene in a bedroom dataset, a synthesized digital image 402 generated by the conventional system based on the first semantic label map 400, and a synthesized digital image 404 generated by the multi-resolution image generation system 102 based on the first semantic label map 400. FIG. 4B illustrates a second semantic label map 406 corresponding to a scene in a person dataset, a synthesized digital image 408 generated by the conventional system based on the second semantic label map 406, and a synthesized digital image 410 generated by the multi-resolution image generation system 102 based on the second semantic label map 406. FIG. 4C illustrates a third semantic label map 412 corresponding to a scene in a cityscape dataset, a synthesized digital image 414 generated by the conventional system based on the third semantic label map 412, and a synthesized digital image 416 generated by the multi-resolution image generation system 102 based on the third semantic label map 412. As illustrated in FIGS. 4A-4C, the multi-resolution image generation system 102 provides more accurate and more varied details of individual objects during image synthesis than the conventional system.

FIG. 5 illustrates a comparison of synthesized digital images generated by the multi-resolution image generation system 102 with multi-resolution features via a multi-resolution generator neural network and synthesized digital images generated without use of the multi-resolution features in an ablation study. In particular, FIG. 5 illustrates a semantic label map 500 for a scene in a bedroom dataset, a synthesized digital image 502 generated without multi-resolution features, and a synthesized digital image 504 generated with multi-resolution features. More specifically, the synthesized digital image 502 generated without multi-resolution features is a result of using the initial feature set of the base encoder 308a of FIG. 3A (i.e., a 512×32×32 feature from the last residual block in the base encoder 308a) as the starting feature for the decoder 306. As illustrated, the image quality without using multi-resolution features is lower than the image quality using multi-resolution features. The ablation study determined that the Frechet Inception Distance ("FID") score of the synthesized digital images without multi-resolution features (40.88) is higher than the FID score of the synthesized digital images with multi-resolution features (33.17).

Figure 6A:
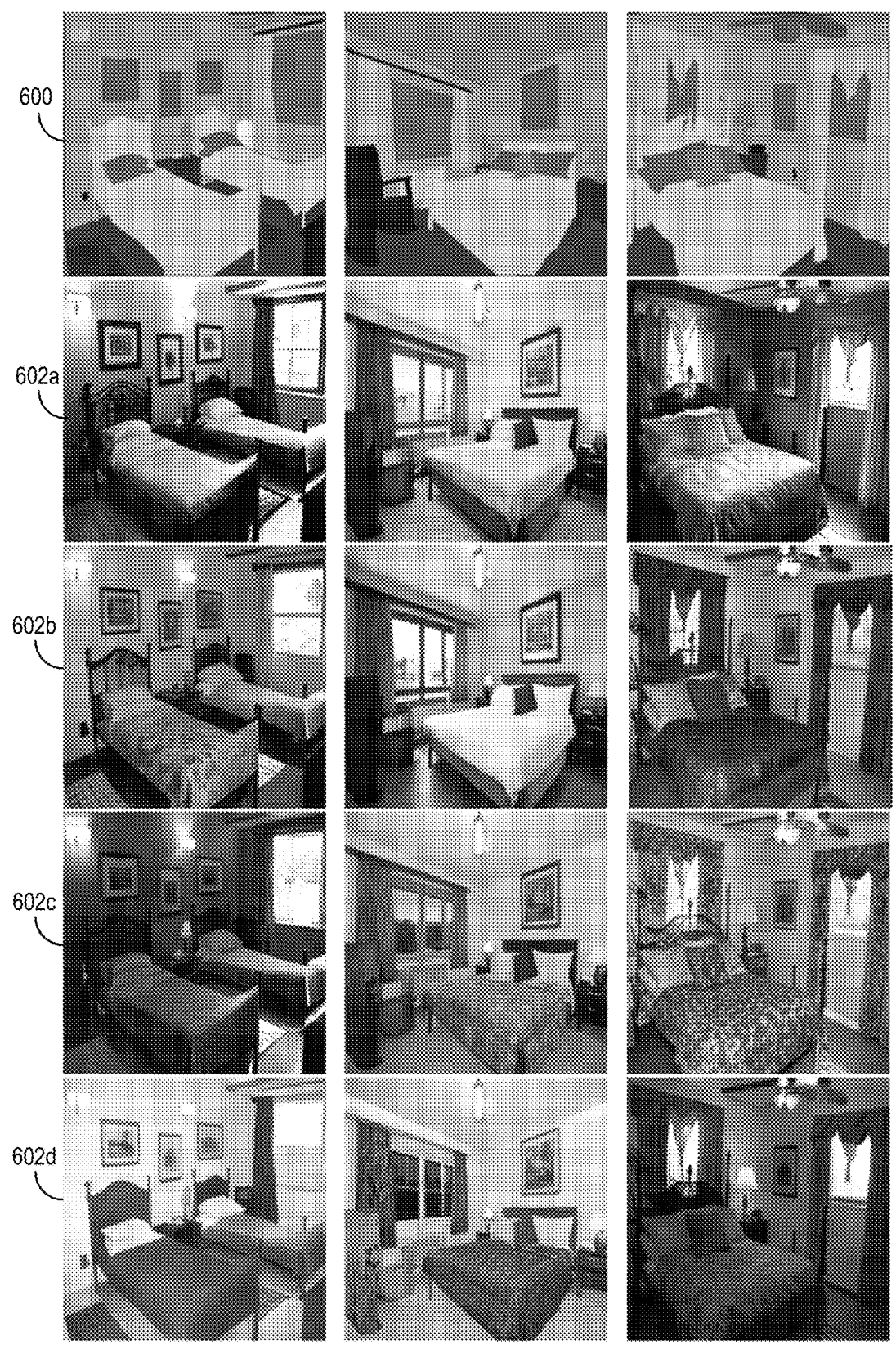
FIGS. 6A-6C illustrate synthesized digital images for a plurality of different image datasets in accordance with one or more implementations.
Figure 6B:
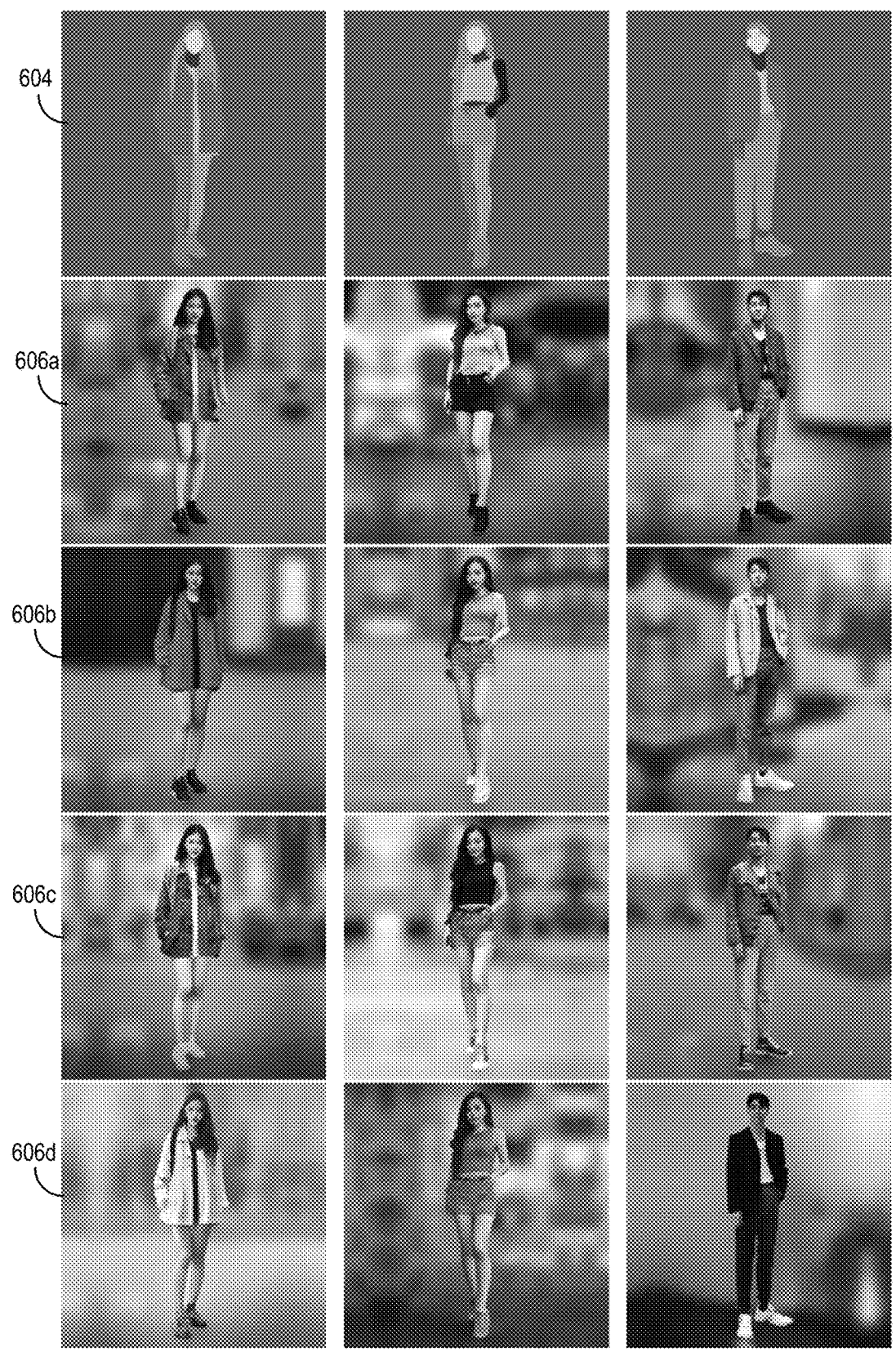
Figure 6C:

FIGS. 6A-6C illustrate a plurality of synthesized digital images utilizing a multi-resolution generator neural network from semantic label maps of a plurality of different datasets. Specifically, FIG. 6A illustrates multi-modal synthesized digital images for scenes in a bedroom dataset (e.g., by sampling different latent codes). For example, the multi-resolution image generation system 102 utilizes a first semantic label map 600 including a bedroom scene to generate a plurality of synthesized digital images 602a-602d with varied synthesized details for bedroom furniture objects. FIG. 6B illustrates multi-modal synthesized digital images for scenes in a person dataset. For instance, the multi-resolution image generation system 102 utilizes a second semantic label map 604 including a person scene to generate a plurality of synthesized digital images 606a-606d with varied synthesized details for a person object. FIG. 6C illustrates multi-modal synthesized digital images for scenes in a cityscape dataset. To illustrate, the multi-resolution image generation system 102 utilizes a third semantic label map 608 including a cityscape scene to generate a plurality of synthesized digital images 610a-610d with varied synthesized details for objects in a cityscape.

According to an embodiment, experimental data includes quantitative and qualitative evaluations comparing results of a multi-resolution generator neural network that the multi-resolution image generation system 102 utilizes to generate synthesized digital images and a generator neural network that a conventional system (SPADE) utilizes to generate synthesized digital images. For example, the experimental data includes comparisons based on a bedroom dataset, a full human body dataset, and a cityscape dataset. In particular, the bedroom dataset combines two datasets including images according to a "bedroom" category and a "hotel room" category. Furthermore, the full human body dataset includes high resolution images of full human bodies with blurred backgrounds and annotated with 24 classes such as faces, upper-cloths, left shoes, and right shoes. The cityscapes dataset includes street scene images. The multi-resolution image generation system 102 trained the base generator neural networks to generate 512×512 resolution images for the bedroom and full human body datasets and 1024×512 images for the cityscapes dataset.

Table 1 illustrates FID scores of the multi-resolution image generation system 102 ("System 102") compared to scores of results from a conventional system using SPADE and two variants of SPADE—"LGGAN" as described by Hao Tang, Dan Xu, Yan Yan, Philip H. S. Torr, and Nicu Sebe in "Local class-specific and global image-level generative adversarial networks for semantic-guided scene generation" in Conference on Computer Vision and Pattern Recognition (2020); and "OASIS" as described by Vadim Sushko, Edgar Schonfeld, Dan Zhang, Juergen Gall, Bernt Schiele, and Anna Khoreva in "You only need adversarial supervision for semantic image synthesis" in International Conference on Learning Representations (2021). The experimental data includes generator neural networks for the conventional systems trained at higher resolution (with default parameters) and provided with an instance map for fair comparison. SPADE and OASIS resulted in significant memory usage (i.e., ~16 GB per image to train 512×512 bedroom images), while the object editing system 102 used ~4 GB per such image. LGGAN was incapable of fitting a single image on a 32 GB V100 GPU for the bedroom dataset due to the large number of parameters and separate convolutional layers for each class and resulted in slow training for the other datasets with fewer classes.

TABLE 1

| Datasets | SPADE | OASIS | LGGAN | System 102 |
|---|---|---|---|---|
| Bedroom | 44.38 | 39.21 | N/A | 33.17 |
| Human | 38.53 | 8.65 | N/A | 7.22 |
| Cityscapes | 59.68 | 50.90 | 61.46 | 47.07 |

The experimental data utilizes FID scores to measure the distance between a distribution of real images and synthesized digital images in the feature space. As illustrated above, the multi-resolution image generation system 102 achieves lower (better) FID scores than the conventional system utilizing SPADE.

Furthermore, Table 2 below illustrates the results of a user study that requested a plurality of users to evaluate image quality. In particular, in the experimental embodiment, users viewed synthesized digital images side-by-side in connection with a segmentation map and then selected which image looked more realistic. As indicated below, the results indicate that users strongly favored the results of the multi-resolution image generation system 102 utilizing multi-resolution features over the conventional system that utilized SPADE, OASIS, and LGGAN.

TABLE 2

| Datasets | System 102 vs SPADE | System 102 vs OASIS | System 102 vs LGGAN |
|---|---|---|---|
| Bedroom | 90.0% | 73.2% | N/A |
| Human | 82.4% | 63.2% | N/A |
| Cityscapes | 59.2% | 35.2% | 62.0% |

Figure 7:
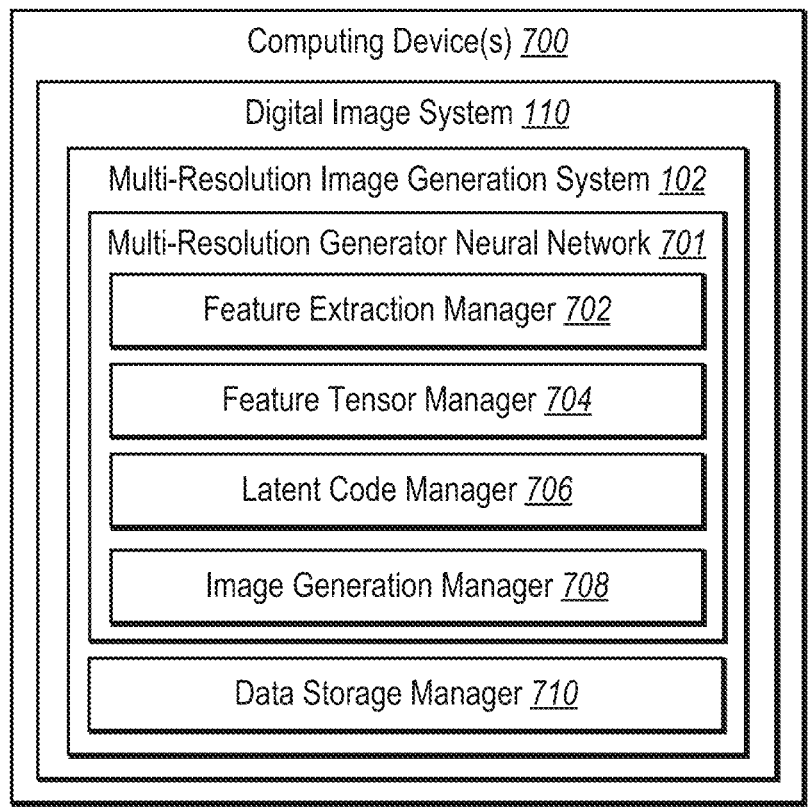
FIG. 7 illustrates a diagram of the multi-resolution image generation system of FIG. 1 in accordance with one or more implementations.

FIG. 7 illustrates a detailed schematic diagram of an embodiment of the multi-resolution image generation system 102 described above. As shown, the multi-resolution image generation system 102 is implemented in a digital image system 110 on computing device(s) 700 (e.g., a client device and/or server device as described in FIG. 1, and as further described below in relation to FIG. 9). Additionally, in one or more embodiments, the multi-resolution image generation system 102 includes, but is not limited to, a feature extraction manager 702, a feature tensor manager 704, a latent code manager 706, an image generation manager 708, and a data storage manager 710. The multi-resolution image generation system 102 can be implemented on any number of computing devices. In one or more embodiments, the multi-resolution image generation system 102 is implemented in a distributed system of server devices for synthetic digital image generation. In alternative embodiments, the multi-resolution image generation system 102 is implemented within one or more additional systems. Alternatively, the multi-resolution image generation system 102 may be implemented on a single computing device such as a single client device.

In one or more embodiments, each of the components of the multi-resolution image generation system 102 is in communication with other components using any suitable communication technologies. Additionally, in some embodiments, the components of the multi-resolution image generation system 102 are in communication with one or more other devices including other computing devices of a user, server devices (e.g., cloud storage devices), licensing servers, or other devices/systems. It will be recognized that although the components of the multi-resolution image generation system 102 are shown to be separate in FIG. 7, any of the subcomponents may be combined into fewer components, such as into a single component, or divided into more components as may serve a particular implementation. Furthermore, although the components of FIG. 7 are described in connection with the multi-resolution image generation system 102, in one or more embodiments, at least some of the components for performing operations in conjunction with the multi-resolution image generation system 102 described herein are implemented on other devices within the environment.

In some embodiments, the components of the multi-resolution image generation system 102 include software, hardware, or both. For example, the components of the multi-resolution image generation system 102 include one or more instructions stored on a computer-readable storage medium and executable by processors of one or more computing devices (e.g., the computing device(s) 700). When executed by the one or more processors, the computer-executable instructions of the multi-resolution image generation system 102 can cause the computing device(s) 700 to perform the operations described herein. Alternatively, the components of the multi-resolution image generation system 102 can include hardware, such as a special purpose processing device to perform a certain function or group of functions. Additionally, or alternatively, the components of the multi-resolution image generation system 102 can include a combination of computer-executable instructions and hardware.

Furthermore, the components of the multi-resolution image generation system 102 performing the functions described herein with respect to the multi-resolution image generation system 102 may, for example, be implemented as part of a stand-alone application, as a module of an application, as a plug-in for applications, as a library function or functions that may be called by other applications, and/or as a cloud-computing model. Thus, the components of the multi-resolution image generation system 102 may be implemented as part of a stand-alone application on a personal computing device or a mobile device. Alternatively, or additionally, the components of the multi-resolution image generation system 102 may be implemented in any application that provides digital image modification, including, but not limited to ADOBE® PHOTOSHOP®, ADOBE® AFTER EFFECTS®, ADOBE® ILLUSTRATOR®, ADOBE® PHOTOSHOP® ELEMENTS, and ADOBE® CREATIVE CLOUD® software. "ADOBE," "PHOTOSHOP," "AFTER EFFECTS," "ILLUSTRATOR," and "CREATIVE CLOUD" are either registered trademarks or trademarks of Adobe Inc. in the United States and/or other countries.

In one or more embodiments, the feature extraction manager 702 provides feature extraction for scenes during digital image synthesis. For example, the feature extraction manager 702 extracts a plurality of feature sets at a plurality of different resolutions. To illustrate, the feature extraction manager 702 utilizes a plurality of neural network layers of the multi-resolution generator neural network 701 such as convolutional neural network layers and a plurality of residual blocks to extract feature sets from a semantic label map at the different resolutions. In some embodiments, the feature extraction manager 702 also utilizes additional priors such as an edge map to extract feature sets at a plurality of resolutions.

According to one or more embodiments, the feature tensor manager 704 utilizes multi-resolution features to generate a spatial feature tensor representing features of a scene. For instance, the feature tensor manager 704 aggregates a plurality of feature sets at a plurality of different resolutions to generate a two-dimensional spatial feature tensor. In one or more embodiments, the feature tensor manager 704 generates the spatial feature tensor by upsampling and aggregating a plurality of different feature sets at different resolutions from the feature extraction manager 702 utilizing a plurality of neural network layers (e.g., residual blocks) with lateral connection in the multi-resolution generator neural network 701.

Additionally, in one or more embodiments, the latent code manager 706 generates a latent code from extracted features of a scene. Specifically, the latent code manager 706 utilizes a reduced resolution feature set extracted by the feature extraction manager 702 to generate the latent code. To illustrate, the latent code manager 706 utilizes a plurality of neural network layers in the multi-resolution generator neural network 701 to flatten the reduced resolution feature set and then determine distribution values such as via a mean value and a variance value for the features.

In one or more embodiments, the image generation manager 708 provides generation and management of synthesized digital images. For example, the image generation manager 708 utilizes a decoder to generate synthesized digital images with multi-resolution features based on the spatial feature tensor and the latent code generated by the feature tensor manager 704 and the latent code manager 706, respectively. To illustrate, the image generation manager 708 utilizes a plurality of neural network layers in the multi-resolution generator neural network 701 to modulate and up-sample features from the spatial feature tensor according to the distribution information encoded in the latent code. In one or more embodiments, the image generation manager 708 also generates variations of synthesized digital images from the same semantic label map.

The multi-resolution image generation system 102 also includes a data storage manager 710 (that comprises a non-transitory computer memory/one or more memory devices) that stores and maintains data associated with processing digital images. For example, the data storage manager 710 stores data associated with generating synthesized digital images. To illustrate, the data storage manager 710 stores information associated with semantic label maps, edge maps, multi-resolution features, spatial feature tensors, latent codes, and a multi-resolution generator neural network.

Figure 8:
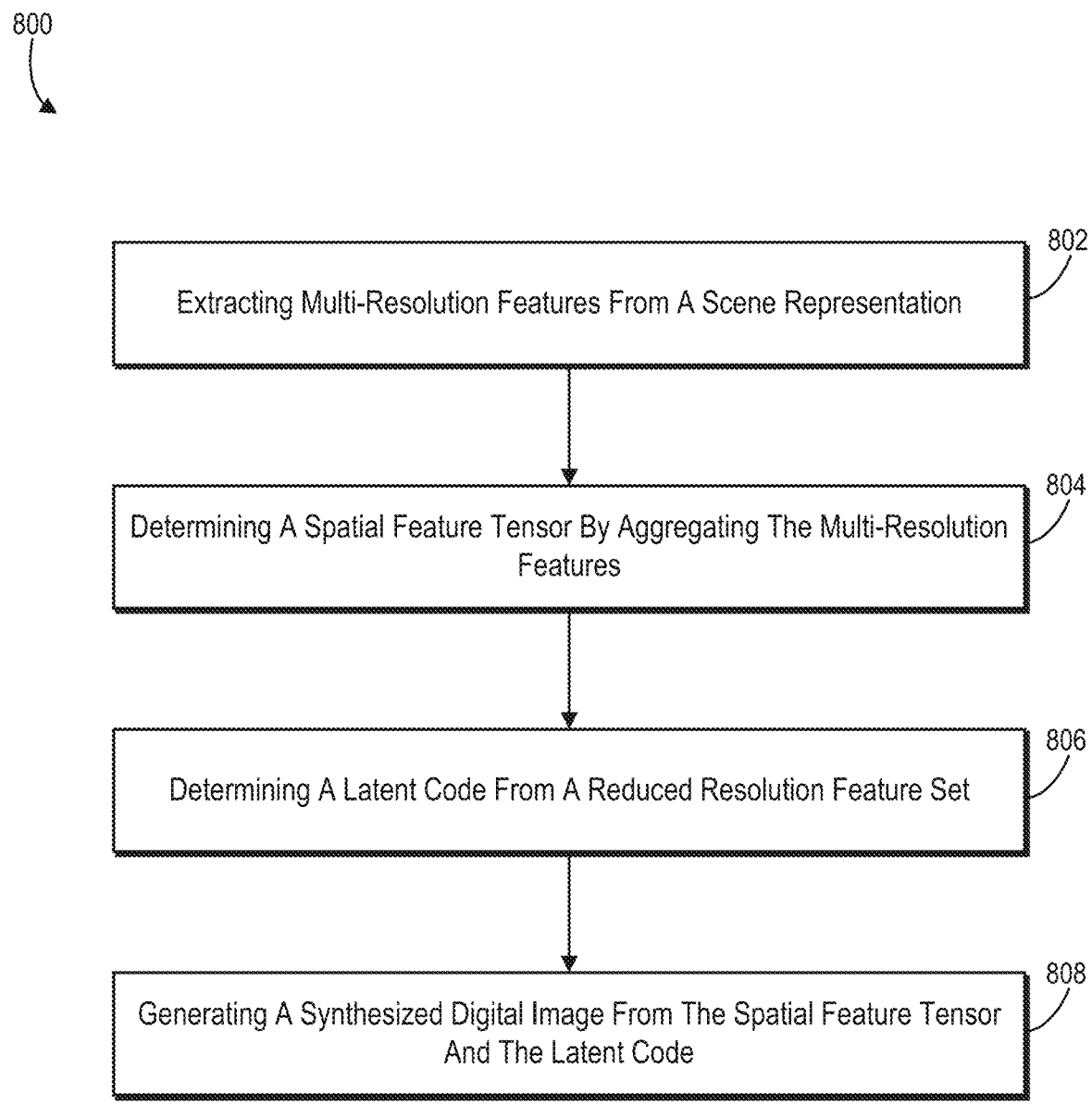
FIG. 8 illustrates a flowchart of a series of acts for generating synthesized digital images utilizing multi-resolution features extracted from scene representations in accordance with one or more implementations.

Turning now to FIG. 8, this figure shows a flowchart of a series of acts 800 of generating synthesized digital images utilizing multi-resolution features extracted from scene representations. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of extracting multi-resolution features from a scene representation. For example, act 802 involves extracting, utilizing a first set of encoder neural network layers, a plurality of feature sets at a plurality of different resolutions from a semantic label map representing a layout of a scene.

In one or more embodiments, act 802 involves utilizing a base encoder that generates a feature set from a semantic label map via a first subset of encoder neural network layers. For example, act 802 involves extracting the plurality of feature sets based on a plurality of object labels in the semantic label map and a plurality of object edges in an edge map associated with the semantic label map. Act 802 then involves utilizing a bottom-up encoder that extracts multi-resolution features from the semantic feature set of the base encoder via a second subset of encoder neural network layers. Act 802 can involve generating a plurality of feature sets at a plurality of different resolutions by utilizing a plurality of downsampling neural network layers in series.

For example, act 802 can involve generating a first feature set based on an initial feature representation of the semantic label map by utilizing a first downsampling neural network layer of the first set of encoder neural network layers. Act 802 can also involve generating a second feature set from the first feature set by utilizing a second downsampling neural network layer of the first set of encoder neural network layers. In one or more, embodiments, the first downsampling neural network layer comprises a first residual neural network layer, and the second downsampling neural network layer comprises a second residual neural network layer. Act 802 can also involve generating a third feature set from the second feature set by utilizing a third downsampling neural network layer of the first set of encoder neural network layers.

The series of acts 800 also includes an act 804 of determining a spatial feature tensor by aggregating the multi-resolution features. For example, act 804 involves determining, utilizing a second set of encoder neural network layers, a spatial feature tensor by aggregating the plurality of feature sets at the plurality of different resolutions.

In one or more embodiments, act 804 can involve utilizing a top-down encoder to determine a two-dimensional spatial feature tensor. For example, act 804 can involve generating modified feature sets from the plurality of feature sets by utilizing a plurality of upsampling neural network layers in series. Act 804 can then involve aggregating the modified feature sets with the lateral connections between the plurality of downsampling neural network layers and the plurality of upsampling neural network layers at the plurality of different resolutions. Specifically, act 804 can involve determining a two-dimensional spatial feature tensor for the plurality of feature sets by aggregating the plurality of feature sets via a plurality of sequential upsampling neural network layers and feature combination layers.

Act 804 can involve generating a modified second feature set from the second feature set by utilizing a first upsampling neural network layer of the second set of encoder neural network layers. Act 804 can also involve generating an aggregated feature set by combining the first feature set and the modified second feature set at a resolution of the first feature set. Act 804 can then involve determining the spatial feature tensor from the aggregated feature set. In one or more embodiments, the top-down encoder includes a leaky rectified linear unit neural network layer to generate the two-dimensional spatial feature tensor from the aggregated feature set at the first down-sampled resolution corresponding to the feature set generated by the base encoder.

In one or more embodiments, act 804 involves generating a modified third feature set from the third feature set by utilizing a second upsampling neural network layer of the second set of encoder neural network layers. Act 804 can then involve generating the modified second feature set from the second feature set aggregated with the modified third feature set at the resolution of the first feature set.

Additionally, the series of acts 800 includes an act 806 of determining a latent code from a reduced resolution feature set. For example, act 806 involves determining, utilizing a third set of encoder neural network layers, a latent code from a reduced resolution feature set of the plurality of feature sets. Act 806 can involve determining a mean value and a variance value based on the reduced resolution feature set. For instance, act 806 can involve flattening the reduced resolution feature set to generate a flattened feature set representing the reduced resolution feature set by utilizing a reshape neural network layer of the third set of encoder neural network layers. Act 806 can also involve determining the mean value and the variance value from the flattened feature set by utilizing a plurality of fully connected neural network layers of the third set of encoder neural network layers. Act 808 can then involve determining the latent code from the mean value and the variance value of the reduced resolution feature set.

Furthermore, the series of acts 800 includes an act 808 of generating a synthesized digital image from the spatial feature tensor and the latent code. For example, act 808 involves generating, utilizing a generator neural network, a synthesized digital image comprising the scene based on the spatial feature tensor and the latent code. In one or more embodiments, act 808 involves utilizing a decoder that generates a digital image from the spatial feature tensor and the latent code to generate a synthesized digital image with a semantic layout of the semantic label map.

In one or more embodiments, act 808 involves generating a transformed latent code by utilizing a mapping neural network layer of the decoder to modify a feature distribution of the latent code based on a feature distribution associated with the decoder. Act 808 can then involve generating the synthesized digital image with the semantic layout of the semantic label map based on the two-dimensional spatial feature tensor and the transformed latent code.

According to one or more embodiments, the series of acts 800 includes determining an encoder loss by modifying the latent code according to a reference distribution. The series of acts 800 can also include determining a perceptual loss by comparing the synthesized digital image to a digital image comprising the digital image scene. The series of acts 800 can include determining a generator loss based on an adversarial loss and one or more regularization losses associated with the decoder. Additionally, the series of acts 800 can include modifying parameters of the bottom-up encoder, the top-down encoder, and the decoder based on the encoder loss, the perceptual loss, and the generator loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
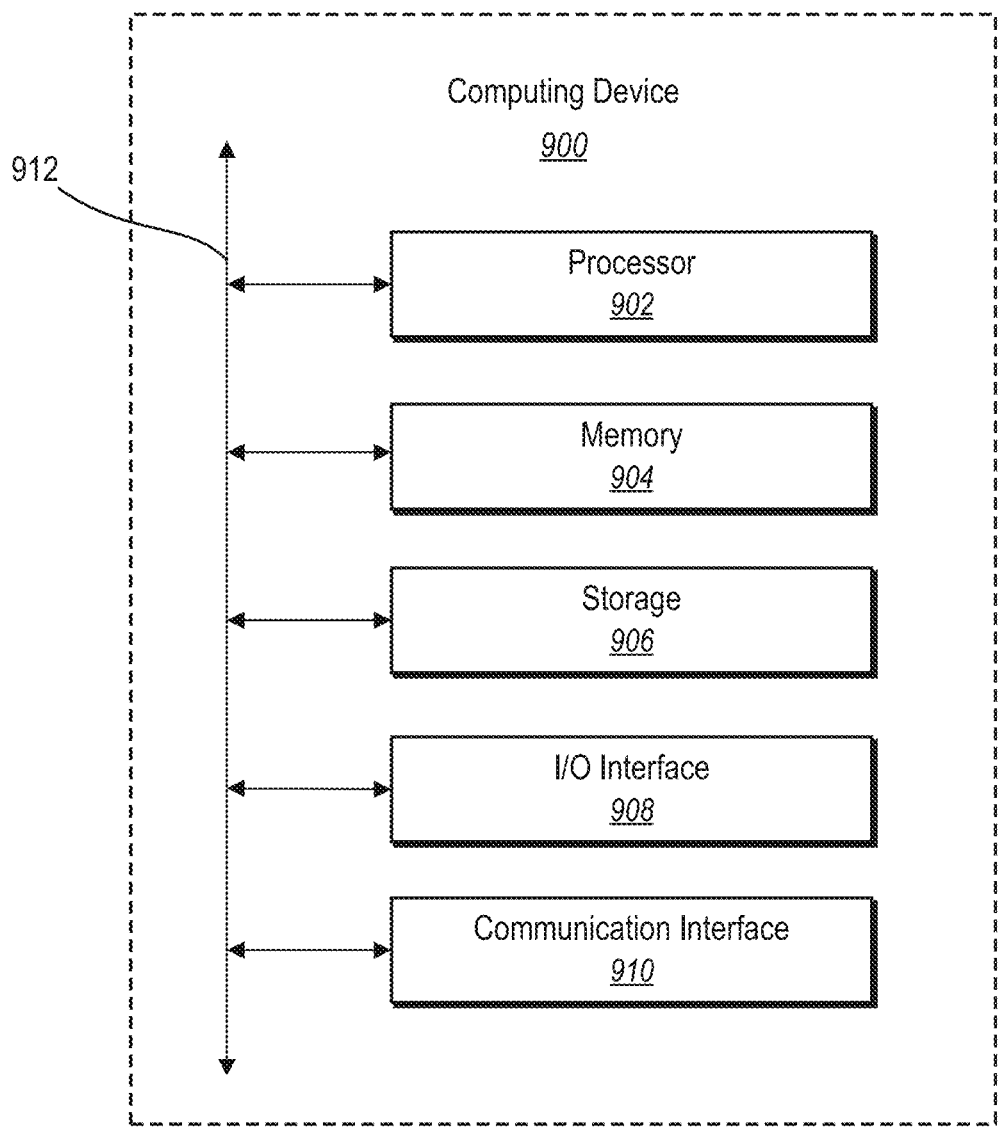
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   extract, utilizing a first set of encoder neural network layers, a plurality of feature sets at a plurality of different resolutions from a semantic label map representing a layout of a scene;
   determine, utilizing a second set of encoder neural network layers, a spatial feature tensor by aggregating the plurality of feature sets at the plurality of different resolutions;
   determine, utilizing a third set of encoder neural network layers, a latent code from a reduced resolution feature set of the plurality of feature sets; and
   generate, utilizing a generator neural network, a synthesized digital image comprising the scene based on the spatial feature tensor and the latent code.

2. The non-transitory computer readable storage medium as recited in claim 1, further comprising instructions that, when executed by the at least one processor, cause the computing device to extract the plurality of feature sets at the plurality of different resolutions by:
   generating a first feature set based on an initial feature representation of the semantic label map by utilizing a first downsampling neural network layer of the first set of encoder neural network layers; and
   generating a second feature set from the first feature set by utilizing a second downsampling neural network layer of the first set of encoder neural network layers.

3. The non-transitory computer readable storage medium as recited in claim 2, wherein the first downsampling neural network layer comprises a first residual neural network layer, and the second downsampling neural network layer comprises a second residual neural network layer.

4. The non-transitory computer readable storage medium as recited in claim 2, further comprising instructions that, when executed by the at least one processor, cause the computing device to determine the spatial feature tensor by:
   generating a modified second feature set from the second feature set by utilizing a first upsampling neural network layer of the second set of encoder neural network layers;
   generating an aggregated feature set by combining the first feature set and the modified second feature set at a resolution of the first feature set; and
   determining the spatial feature tensor from the aggregated feature set.

5. The non-transitory computer readable storage medium as recited in claim 4, further comprising instructions that, when executed by the at least one processor, cause the computing device to:
   extract the plurality of feature sets at the plurality of different resolutions by generating a third feature set from the second feature set by utilizing a third downsampling neural network layer of the first set of encoder neural network layers;
   generate a modified third feature set from the third feature set by utilizing a second upsampling neural network layer of the second set of encoder neural network layers; and
   generate the modified second feature set from the second feature set aggregated with the modified third feature set at the resolution of the first feature set.

6. The non-transitory computer readable storage medium as recited in claim 1, further comprising instructions that, when executed by the at least one processor, cause the computing device to determine the latent code by:
   determining a mean value and a variance value based on the reduced resolution feature set; and
   determining the latent code from the mean value and the variance value of the reduced resolution feature set.

7. The non-transitory computer readable storage medium as recited in claim 6, further comprising instructions that, when executed by the at least one processor, cause the computing device to determine the mean value and the variance value by:
   flattening the reduced resolution feature set to generate a flattened feature set representing the reduced resolution feature set by utilizing a reshape neural network layer of the third set of encoder neural network layers; and
   determining the mean value and the variance value from the flattened feature set by utilizing a plurality of fully connected neural network layers of the third set of encoder neural network layers.

8. The non-transitory computer readable storage medium as recited in claim 1, further comprising instructions that, when executed by the at least one processor, cause the computing device to extract the plurality of feature sets at the plurality of resolutions by extracting the plurality of feature sets based on a plurality of object labels in the semantic label map and a plurality of object edges in an edge map associated with the semantic label map.

9. A system comprising:
   one or more memory devices comprising a multi-resolution generator neural network comprising:
      a base encoder that generates a feature set from a semantic label map;
      a bottom-up encoder that extracts multi-resolution features and generates a latent code from the feature set;
      a top-down encoder that determines a two-dimensional spatial feature tensor for the multi-resolution features by aggregating the multi-resolution features with lateral connections;
      a decoder that generates a digital image from the two-dimensional spatial feature tensor and the latent code; and
   one or more processors configured to cause the system to generate, utilizing the multi-resolution generator neural network, a synthesized digital image with a semantic layout of the semantic label map.

10. The system as recited in claim 9, wherein the bottom-up encoder extracts the multi-resolution features by generating a plurality of feature sets at a plurality of different resolutions by utilizing a plurality of downsampling neural network layers in series.

11. The system as recited in claim 10, wherein the top-down encoder determines the two-dimensional spatial feature tensor by:
generating modified feature sets from the plurality of feature sets by utilizing a plurality of upsampling neural network layers in series; and
aggregating the modified feature sets with the lateral connections between the plurality of downsampling neural network layers and the plurality of upsampling neural network layers at the plurality of different resolutions.

12. The system as recited in claim 11, wherein:
the bottom-up encoder:
extracts a first feature set of the plurality of feature sets at a first down-sampled resolution by utilizing a first downsampling neural network layer; and
extracts a second feature set of the plurality of feature sets at a second down-sampled resolution by utilizing a second downsampling neural network layer; and
the top-down encoder:
generates a modified feature set from the second feature set at the first down-sampled resolution by utilizing a first upsampling neural network layer; and
generates an aggregated feature set by combining the first feature set and the modified feature set at the first down-sampled resolution.

13. The system as recited in claim 12, wherein the top-down encoder comprises a leaky rectified linear unit neural network layer to generate the two-dimensional spatial feature tensor from the aggregated feature set at the first down-sampled resolution.

14. The system as recited in claim 9, wherein the one or more processors are further configured to cause the system to generate the synthesized digital image by:
generating a transformed latent code by utilizing a mapping neural network layer of the decoder to modify a feature distribution of the latent code based on a feature distribution associated with the decoder; and
generating the synthesized digital image with the semantic layout of the semantic label map based on the two-dimensional spatial feature tensor and the transformed latent code.

15. The system as recited in claim 9, wherein the one or more processors are further configured to cause the system to:
determine an encoder loss by modifying the latent code according to a reference distribution;
determine a perceptual loss by comparing the synthesized digital image to a digital image comprising a digital image scene;
determine a generator loss based on an adversarial loss and one or more regularization losses associated with the decoder; and
modify parameters of the bottom-up encoder, the top-down encoder, and the decoder based on the encoder loss, the perceptual loss, and the generator loss.

16. The system as recited in claim 9, wherein the bottom-up encoder determines the latent code from a mean value and a variance value corresponding to the reduced resolution feature set at the reduced resolution.

17. A computer-implemented method comprising:
extracting, by at least one processor, a plurality of feature sets at different resolutions from a semantic label map comprising a plurality of labeled objects via a plurality of sequential downsampling neural network layers;
determining, by the at least one processor, a two-dimensional spatial feature tensor for the plurality of feature sets by aggregating the plurality of feature sets via a plurality of sequential upsampling neural network layers and feature combination layers;
determining, by the at least one processor, a latent code from a reduced resolution feature set of the plurality of feature sets via a plurality of fully connected neural network layers;
transforming, by the at least one processor, the latent code corresponding to the reduced resolution feature set based on a feature distribution associated with learned parameters of a generator neural network; and
generating, by the at least one processor utilizing the generator neural network, a synthesized digital image based on the two-dimensional spatial feature tensor and the transformed latent code.

18. The computer-implemented method as recited in claim 17, wherein extracting the plurality of feature sets comprises:
generating a first feature set based on the semantic label map at a first resolution by utilizing a first subset of encoder neural network layers of the plurality of sequential downsampling neural network layers;
generating a plurality of additional feature sets from the first feature set at a plurality of additional resolutions lower than the first resolution by utilizing a second subset of encoder neural network layers of the plurality of sequential downsampling neural network layers.

19. The computer-implemented method as recited in claim 18, wherein determining the two-dimensional spatial feature tensor comprises determining the two-dimensional spatial feature tensor by utilizing the second set of encoder neural network layers to aggregate the plurality of additional feature sets.

20. The computer-implemented method as recited in claim 17, wherein determining the latent code from the reduced resolution feature set comprises:
generating a flattened feature set by utilizing a reshape neural network layer to modify the reduced resolution feature set;
determining a mean value from the flattened feature set by utilizing a first linear neural network layer;
determining a variance value from the flattened feature set by utilizing a second linear neural network layer; and
determining the latent code based on the mean value and the variance value.

* * * * *